United States Patent
Lim et al.

(10) Patent No.: US 12,288,860 B2
(45) Date of Patent: *Apr. 29, 2025

(54) BATTERY MODULE

(71) Applicant: SAMSUNG SDI CO., LTD., Yongin-si (KR)

(72) Inventors: Dooyong Lim, Yongin-si (KR); Sungyong Kim, Yongin-si (KR); Jaeho Kim, Yongin-si (KR); Soodeok Moon, Yongin-si (KR); Daeyeop Park, Yongin-si (KR); Jangwoong Bae, Yongin-si (KR); Junhyung Lee, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,415

(22) Filed: Feb. 27, 2024

(65) Prior Publication Data

US 2024/0204296 A1 Jun. 20, 2024

Related U.S. Application Data

(63) Continuation of application No. 18/184,637, filed on Mar. 15, 2023, now Pat. No. 12,046,735, which is a (Continued)

(30) Foreign Application Priority Data

Oct. 19, 2018 (KR) .................. 10-2018-0125549

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 6,146,778 A   11/2000 Rouillard et al.
6,255,015 B1   7/2001 Corrigan et al.
(Continued)

FOREIGN PATENT DOCUMENTS

CN   1324499 A   11/2001
CN   1592977 A   3/2005
(Continued)

OTHER PUBLICATIONS

US Final Office Action dated Jun. 3, 2024, issued in U.S. Appl. No. 18/186,797 (13 pages).
(Continued)

*Primary Examiner* — Jonathan Crepeau
(74) *Attorney, Agent, or Firm* — Womble Bond Dickinson (US) LLP

(57) ABSTRACT

A battery module includes a cell stack in which a plurality of unit cells including terminal parts are aligned in a first direction and an insulating member surrounds the plurality of unit cells; and a module housing in which a plurality of receiving parts, into each of which the cell stack is configured to be inserted, are provided and are aligned in a first direction and a second direction perpendicular to the first direction, wherein each of the plurality of receiving parts includes a fixing wall around the cell stack and having at least a portion which is in contact with the cell stack. The cell stacks adjacent to each other in the second direction are
(Continued)

electrically connected to each other, and the cell stacks adjacent to each other in the first direction are electrically disconnected from each other, when not connected to an end module.

16 Claims, 15 Drawing Sheets

Related U.S. Application Data continuation of application No. 16/656,406, filed on Oct. 17, 2019, now Pat. No. 11,637,339.

(51) Int. Cl.
| | |
|---|---|
| *H01M 10/625* | (2014.01) |
| *H01M 10/6556* | (2014.01) |
| *H01M 50/204* | (2021.01) |
| *H01M 50/209* | (2021.01) |
| *H01M 50/24* | (2021.01) |
| *H01M 50/242* | (2021.01) |
| *H01M 50/258* | (2021.01) |
| *H01M 50/262* | (2021.01) |
| *H01M 50/264* | (2021.01) |
| *H01M 50/296* | (2021.01) |
| *H01M 50/505* | (2021.01) |
| *H01M 50/507* | (2021.01) |
| *H01M 50/289* | (2021.01) |

(52) U.S. Cl.
CPC ..... *H01M 10/6556* (2015.04); *H01M 50/204* (2021.01); *H01M 50/209* (2021.01); *H01M 50/24* (2021.01); *H01M 50/242* (2021.01); *H01M 50/258* (2021.01); *H01M 50/262* (2021.01); *H01M 50/264* (2021.01); *H01M 50/296* (2021.01); *H01M 50/505* (2021.01); *H01M 50/507* (2021.01); *H01M 50/289* (2021.01); *H01M 2220/20* (2013.01)

(56) References Cited

U.S. PATENT DOCUMENTS

| | | | |
|---|---|---|---|
| 6,555,264 | B1 | 4/2003 | Hamada et al. |
| 6,864,013 | B2 | 3/2005 | Gow et al. |
| 2005/0079408 | A1 | 4/2005 | Hirano |
| 2005/0255379 | A1 | 11/2005 | Marchio et al. |
| 2007/0005371 | A1 | 1/2007 | Nakagawa et al. |
| 2007/0054561 | A1 | 3/2007 | Gutman et al. |
| 2007/0087266 | A1 | 4/2007 | Bourke et al. |
| 2010/0009251 | A1 | 1/2010 | Shin et al. |
| 2010/0266887 | A1 | 10/2010 | Sekino et al. |
| 2010/0285347 | A1 | 11/2010 | Saito et al. |
| 2011/0076521 | A1 | 3/2011 | Shimizu et al. |
| 2011/0165451 | A1 | 7/2011 | Kim et al. |
| 2011/0300433 | A1 | 12/2011 | Kim |
| 2012/0103714 | A1 | 5/2012 | Choi et al. |
| 2012/0115013 | A1 | 5/2012 | Kim et al. |
| 2012/0177970 | A1 | 7/2012 | Marchio et al. |
| 2013/0045403 | A1 | 2/2013 | Shin et al. |
| 2013/0089763 | A1 | 4/2013 | Lee |
| 2013/0207459 | A1 | 8/2013 | Schröder et al. |
| 2013/0260195 | A1 | 10/2013 | Long |
| 2014/0087221 | A1 | 3/2014 | Kim et al. |
| 2014/0141311 | A1 | 5/2014 | Michelitsch |
| 2014/0234690 | A1 | 8/2014 | Lee et al. |
| 2014/0353057 | A1 | 12/2014 | Adachi |
| 2015/0042158 | A1 | 2/2015 | Schmidt et al. |
| 2015/0072178 | A1 | 3/2015 | Gu |
| 2015/0086831 | A1 | 3/2015 | Haussmann |
| 2015/0229010 | A1 | 8/2015 | Ahn |
| 2015/0357617 | A1 | 12/2015 | Okada |
| 2016/0028056 | A1 | 1/2016 | Lee et al. |
| 2016/0056427 | A1 | 2/2016 | Kim et al. |
| 2016/0118635 | A1 | 4/2016 | Keller et al. |
| 2016/0164054 | A1 | 6/2016 | Yamamoto et al. |
| 2016/0233464 | A1 | 8/2016 | Nusier et al. |
| 2016/0233468 | A1 | 8/2016 | Nusier et al. |
| 2016/0268657 | A1 | 9/2016 | Park et al. |
| 2017/0062783 | A1 | 3/2017 | Kim et al. |
| 2017/0062789 | A1 | 3/2017 | Sim et al. |
| 2017/0133706 | A1 | 5/2017 | Ejima |
| 2017/0222200 | A1 | 8/2017 | Murai et al. |
| 2017/0263910 | A1 | 9/2017 | Kobayashi et al. |
| 2017/0365888 | A1 | 12/2017 | Kwon et al. |
| 2018/0013111 | A1 | 1/2018 | Wuensche et al. |
| 2018/0026243 | A1 | 1/2018 | Stojanovic et al. |
| 2018/0102576 | A1 | 4/2018 | Yamamoto et al. |
| 2018/0109016 | A1 | 4/2018 | Fees et al. |
| 2018/0123200 | A1 | 5/2018 | Golubkov |
| 2018/0138466 | A1 | 5/2018 | Fees et al. |
| 2018/0138473 | A1 | 5/2018 | Bessho et al. |
| 2018/0138560 | A1 | 5/2018 | Bessho |
| 2018/0175466 | A1 | 6/2018 | Seo et al. |
| 2018/0269443 | A1 | 9/2018 | Takahashi et al. |
| 2018/0294452 | A1 | 10/2018 | Tan et al. |
| 2018/0331402 | A1 | 11/2018 | Inoue |
| 2018/0337374 | A1 | 11/2018 | Matecki et al. |
| 2019/0001838 | A1 | 1/2019 | Choi et al. |
| 2019/0088911 | A1 | 3/2019 | Peng et al. |
| 2019/0123318 | A1 | 4/2019 | Fees et al. |
| 2019/0198845 | A1 | 6/2019 | Bae et al. |
| 2019/0221817 | A1 | 7/2019 | Jeon |
| 2019/0296294 | A1 | 9/2019 | Hirschbeck et al. |
| 2019/0305273 | A1 | 10/2019 | Long et al. |
| 2019/0348725 | A1 | 11/2019 | Golubkov |
| 2020/0006824 | A1 | 1/2020 | Lim |
| 2020/0067155 | A1 | 2/2020 | Hwang et al. |
| 2020/0127258 | A1 | 4/2020 | Lim et al. |
| 2020/0313128 | A1 | 10/2020 | Schnakenberg |
| 2021/0143505 | A1 | 5/2021 | Hidaka |

FOREIGN PATENT DOCUMENTS

| | | |
|---|---|---|
| CN | 102117930 A | 7/2011 |
| CN | 102270754 A | 12/2011 |
| CN | 102934254 A | 2/2013 |
| CN | 103035975 A | 4/2013 |
| CN | 103380511 A | 10/2013 |
| CN | 103890997 A | 6/2014 |
| CN | 104137294 A | 11/2014 |
| CN | 104617244 A | 5/2015 |
| CN | 104835980 A | 8/2015 |
| CN | 104904033 A | 9/2015 |
| CN | 104995760 A | 10/2015 |
| CN | 105552261 A | 5/2016 |
| CN | 105870370 A | 8/2016 |
| CN | 205768594 U | 12/2016 |
| CN | 106299176 A | 1/2017 |
| CN | 106486622 A | 3/2017 |
| CN | 106797005 A | 5/2017 |
| CN | 206210887 U | 5/2017 |
| CN | 206584990 U | 10/2017 |
| CN | 107528019 A | 12/2017 |
| CN | 107591500 A | 1/2018 |
| CN | 107644960 A | 1/2018 |
| CN | 107658401 A | 2/2018 |
| CN | 207199697 U | 4/2018 |
| CN | 207398218 U | 5/2018 |
| CN | 108365156 A | 8/2018 |
| CN | 108463902 A | 8/2018 |
| CN | 207690855 U | 8/2018 |
| CN | 207818706 U | 9/2018 |
| CN | 108630851 A | 10/2018 |
| CN | 210628373 U | 5/2020 |
| EP | 2450990 A2 | 5/2012 |
| EP | 2 608 309 A1 | 6/2013 |
| EP | 3 273 500 A1 | 1/2018 |
| EP | 3267507 A1 | 1/2018 |
| EP | 3 316 340 A1 | 5/2018 |
| EP | 3 327 817 A1 | 5/2018 |
| JP | 2003-249202 A | 9/2003 |

(56) References Cited

FOREIGN PATENT DOCUMENTS

| | | | |
|---|---|---|---|
| JP | 2004-171856 A | 6/2004 |
| JP | 3906706 B2 | 4/2007 |
| JP | 2009-231042 A | 10/2009 |
| JP | 2013-008521 A | 1/2013 |
| JP | 2017-37754 A | 2/2017 |
| JP | 6095813 B2 | 3/2017 |
| JP | 6117308 B2 | 4/2017 |
| JP | 6224321 B2 | 11/2017 |
| JP | 2018-073551 A | 5/2018 |
| KR | 10-2010-0055477 A | 5/2010 |
| KR | 10-2013-0001381 A | 1/2013 |
| KR | 10-2013-0078933 A | 7/2013 |
| KR | 10-2013-0113740 A | 10/2013 |
| KR | 10-2015-0029371 A | 3/2015 |
| KR | 10-1584295 B1 | 1/2016 |
| KR | 10-2016-0037542 A | 4/2016 |
| KR | 10-2017-0011212 A | 2/2017 |
| KR | 10-2017-0025074 A | 3/2017 |
| KR | 10-2017-0053429 A | 5/2017 |
| KR | 10-2018-0010989 A | 1/2018 |
| KR | 10-2018-0045840 A | 5/2018 |
| KR | 10-2018-0054382 A | 5/2018 |
| KR | 10-2018-0060997 A | 6/2018 |
| KR | 10-2019-0079367 A | 7/2019 |
| WO | WO 00/11730 A1 | 3/2000 |
| WO | WO 2007/027603 A2 | 3/2007 |
| WO | WO 2016/166972 A1 | 10/2016 |
| WO | WO 2017/132575 A1 | 8/2017 |
| WO | WO 2017/203911 A1 | 11/2017 |
| WO | WO 2017/220515 A1 | 12/2017 |
| WO | WO 2018/016816 A1 | 1/2018 |
| WO | WO 2018/062869 A1 | 4/2018 |
| WO | WO 2018/105981 A1 | 6/2018 |
| WO | WO 2018/142809 A1 | 8/2018 |

OTHER PUBLICATIONS

Chinese Notice of Allowance dated Jun. 15, 2022, issued in Chinese Patent Application No. 201910989841.2 (7 pages).
Chinese Notice of Allowance, with English translation, dated Jul. 25, 2022, issued in Chinese Patent Application No. 201910988354.4 (6 pages).
Chinese Notice of Allowance, with English translation, dated Nov. 4, 2022, issued in corresponding Chinese Patent Application No. 201910990468.2 (6 pages).
Chinese Office action dated Jun. 15, 2022, issued in Chinese Patent Application No. 201910988939.6 (9 pages).
Chinese Office action, with English translation, dated Aug. 3, 2022, issued in Chinese Patent Application No. 201910990468.2 (27 pages).
Chinese Office Action, with English translation, dated Dec. 2, 2021, issued in Chinese Patent Application No. 201910988939.6 (22 pages).
Chinese Office Action, with English translation, dated Dec. 21, 2021, issued in corresponding Chinese Patent Application No. 201910989914.8 (18 pages).
Chinese Office Action, with English translation, dated Dec. 23, 2021, issued in corresponding Chinese Patent Application No. 201910990468.2 (15 pages).
Chinese Office Action, with English translation, dated Dec. 24, 2021, issued in Chinese Patent Application No. 201910988354.4 (21 pages).
Chinese Office Action, with English translation, dated Dec. 28, 2021, issued in Chinese Patent Application No. 201910989841.2 (16 pages).
Chinese Office Action, with English translation, dated Dec. 3, 2021, issued in corresponding Chinese Patent Application No. 201910989674.1 (23 pages).
Chinese Office action, with English translation, dated Jul. 22, 2022, issued in Chinese Patent Application No. 201910989674.1 (19 pages).
Chinese Notice of Allowance, with English translation, dated Jul. 10, 2023, issued in Chinese Patent Application No. 201910989674.1 (9 pages).
EPO Extended Search Report dated Mar. 4, 2020 for corresponding European Patent Application No. 19203926.1 (7 pages).
EPO Office action dated Aug. 5, 2022, issued in European Patent Application No. 19203939.4 (4 pages).
EPO Office action dated Jul. 26, 2022, issued in European Patent Application No. 19203930.3 (5 pages).
EPO Office action dated Sep. 1, 2022, issued in European Patent Application No. 19203935.2 (4 pages).
Extended European Search Report for corresponding European Patent Application No. 19203933.7, dated Feb. 20, 2020, 10 pages.
Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
EPO Extended European Search Report dated May 2, 2023, issued in European Patent Application No. 23150872.2 (7 pages).
Korean Office Action dated May 31, 2023, issued in Korean Patent Application No. 10-2018-0125549 (6 pages).
Korean Office Action dated Jun. 20, 2023, issued in Korean Patent Application No. 10-2018-0125553 (6 pages).
Korean Office Action dated Jun. 20, 2023, issued in Korean Patent Application No. 10-2018-0125552 (5 pages).
Korean Office Action dated Jun. 20, 2023, issued in Korean Patent Application No. 10-2018-0125551 (6 pages).
Korean Office Action dated Jun. 20, 2023, issued in Korean Patent Application No. 10-2018-0125550 (7 pages).
U.S. Advisory Action from U.S. Appl. No. 16/655,889, filed Feb. 10, 2022, 3 pages.
U.S. Final Office action dated Dec. 17, 2021, issued in U.S. Appl. No. 16/655,889 (8 pages).
U.S. Notice of Allowance dated Aug. 11, 2022, issued in U.S. Appl. No. 16/655,889 (8 pages).
U.S. Notice of Allowance dated Jul. 25, 2022, issued in U.S. Appl. No. 16/656,099 (9 pages).
U.S. Notice of Allowance dated Nov. 16, 2021, issued in U.S. Appl. No. 16/656,099 (9 pages).
U.S. Notice of Allowance from U.S. Appl. No. 16/655,889 dated Apr. 18, 2022, 8 pages.
U.S. Notice of Allowance from U.S. Appl. No. 16/656,099, dated Mar. 9, 2022, 9 pages.
U.S. Office action dated Jul. 7, 2021, issued in U.S. Appl. No. 16/656,099 (9 pages).
U.S. Office action dated Jun. 28, 2021, issued in U.S. Appl. No. 16/655,889 (9 pages).
U.S. Office action dated Nov. 29, 2021, issued in U.S. Appl. No. 16/656,190 (15 pages).
U.S. Office action dated Oct. 26, 2021, issued in U.S. Appl. No. 16/656,197 (11 pages).
U.S. Office action dated Sep. 23, 2022, issued in U.S. Appl. No. 16/656,190 (22 pages).
U.S. Office action from U.S. Appl. No. 16/656,190, filed May 19, 2022, 17 pages.
U.S. Office action from U.S. Appl. No. 16/656,197, filed Apr. 27, 2022, 20 pages.
US Notice of Allowance dated Nov. 22, 2022, issued in U.S. Appl. No. 16/656,099 (9 pages).
US Office action dated Feb. 7, 2023, issued in U.S. Appl. No. 16/655,889 (8 pages).
US Office action dated Sep. 29, 2022, issued in U.S. Appl. No. 16/656,197 (14 pages).
US. Office Action dated Mar. 17, 2021, issued in U.S. Appl. No. 16/656,324 (17 pages).
U.S. Final Office Action dated Jun. 29, 2021, issued in U.S. Appl. No. 16/656,324 (15 pages).
U.S. Advisory Action dated Sep. 2, 2021, issued in U.S. Appl. No. 16/656,324 (3 pages).

(56) References Cited

OTHER PUBLICATIONS

U.S. Notice of Allowance dated Jan. 10, 2022, issued in U.S. Appl. No. 16/656,324 (8 pages).
U.S. Notice of Allowance from U.S. Appl. No. 16/656,324, filed May 4, 2022, 11 pages.
U.S. Notice of Allowance dated Jun. 28, 2022, issued in U.S. Appl. No. 16/656,324 (7 pages).
U.S. Notice of Allowance dated Jul. 20, 2022, issued in U.S. Appl. No. 16/656,324 (11 pages).
US Notice of Allowance dated Dec. 7, 2022, issued in U.S. Appl. No. 16/656,324 (8 pages).
US Final Office Action dated Mar. 20, 2023, issued in U.S. Appl. No. 16/656,190 (20 pages).
US Final Office Action dated Mar. 23, 2023, issued in U.S. Appl. No. 16/656,197 (13 pages).
US Office Action dated Feb. 14, 2024, issued in U.S. Appl. No. 18/186,797 (12 pages).
US Office Action dated Jul. 12, 2024, issued in U.S. Appl. No. 18/525,059 (10 pages).
US Office Action dated Nov. 26, 2024, issued in U.S. Appl. No. 18/186,797 (16 pages).
US Final Office Action dated Jan. 6, 2025, issued in U.S. Appl. No. 18/525,059 (10 pages).
EPO Extended European Search Report dated Mar. 27, 2025, issued in European Patent Application No. 23194224.4, 8 pages.

BATTERY MODULE

CROSS-REFERENCE TO RELATED APPLICATIONS

This application is a continuation of U.S. patent application Ser. No. 18/184,637, filed Mar. 15, 2023, which is a continuation of U.S. patent application Ser. No. 16/656,406, filed Oct. 17, 2019, now U.S. Pat. No. 11,637,339, which claims priority to and the benefit of Korean Patent Application No. 10-2018-0125549, filed Oct. 19, 2018, the entire content of all of which is incorporated herein by reference, and incorporates, in their entirety, by reference U.S. patent application Ser. No. 16/656,197, U.S. patent application Ser. No. 16/656,190, U.S. patent application Ser. No. 16/656,324, U.S. patent application Ser. No. 16/655,889, and U.S. patent application Ser. No. 16/656,099, filed on Oct. 17, 2019.

BACKGROUND

1. Field

One or more aspects of embodiments of the present invention are directed toward a battery module, and more particularly, to a battery module including a plurality of cell stacks each including a plurality of unit cells.

2. Background Art

Rechargeable batteries (sometimes referred to as secondary batteries) differ from primary batteries in that charging and discharging of a secondary battery may be repeated, and the primary batteries provide only irreversible conversion from a chemical material to electrical energy. A low-capacity rechargeable battery may be used as a power source for small electronic devices such as a cellular phone, a notebook computer, a desktop computer, and/or a camcorder, and a large-capacity rechargeable battery may be used as a power source for a hybrid vehicle and/or the like.

The secondary battery may include an electrode assembly including a cathode, an anode, and a separator interposed between the cathode and the anode, a case accommodating the electrode assembly, and an electrode terminal electrically connected (e.g., coupled) to the electrode assembly.

An electrolytic solution is injected into the case to enable charging and discharging of the battery by an electrochemical reaction of the cathode, the anode, and the electrolytic solution. For example, a shape of the case may be a cylindrical shape or a rectangular shape, without limitation, and the shape may differ depending on the use (or anticipated use) of the battery.

The rechargeable battery may be used in the form of a cell stack including a plurality of unit cells that are coupled in series with or in parallel to each other, thereby providing high energy density for driving of a hybrid vehicle, for example.

As the development of technology progresses, an amount of electric power required (or desired) for an electric vehicle (EV), a hybrid electric vehicle (HEV) and other electrical energy consuming devices is increased, and a plurality of battery modules may be provided to satisfy the amount of electric power.

Therefore, the development of a new module structure that may simplify the constituent components, effectively reduce the manufacturing cost and weight of the module, and enable the manufacturing process to proceed efficiently while providing a plurality of cell stacks capable of meeting the required (or desired) power of the electrical energy consuming device, is an important task.

In addition, unlike a battery structure including a single cell stack, in a case in which the plurality of cell stacks are provided, it is an important task to effectively implement and operate an electrical connection between the respective cell stacks.

SUMMARY

Technical Problem

One or more aspects of embodiments of the present invention are directed toward a battery module that has an improved amount of electric power, an improved and efficient manufacturing process, and in which the constituent components are simplified by including a plurality of cell stacks.

Technical Solution

In an embodiment of the present invention, a battery module includes: a cell stack, the cell stack comprising a plurality of unit cells aligned with each other in a first direction, each unit cell comprising terminal parts, and an insulating member around the plurality of unit cells; and a module housing in which a plurality of receiving parts are aligned in the first direction and a second direction, crossing the first direction, wherein the cell stack is configured to be inserted into corresponding one of the plurality of receiving parts. Each of the plurality of receiving part includes a fixing wall around the cell stack, at least a portion of which is in contact with the cell stack, and the cell stacks of the plurality of cell stacks adjacent to each other in the second direction are electrically connected to each other, and the cell stacks of the plurality of cell stacks adjacent to each other in the first direction are electrically disconnected from each other, when not connected to an end module.

The battery module may further include: a stack bus bar electrically connecting at least some of the plurality of unit cells to each other; a connection bus bar electrically connecting two cell stacks of the plurality of cell stacks adjacent to each other in the second direction; a terminal bus bar extending from the cell stack; and a module bus bar connected to the terminal bus bar and configured to be extended outside of the module housing and inserted into an adjacent module housing.

The terminal bus bar may be connected to a unit cell of the plurality of unit cells at one end of the cell stack, and the connection bus bar may be connected to a unit cell of the plurality of unit cells at another end thereof.

The plurality of receiving parts may form a first column and a second column arranged with each other in the first direction, each of the first column and the second column extending in the second direction, and the one end of the cell stack may face a region between the first column and the second column and the terminal bus bar may extend to overlap the region between the first column and the second column.

The terminal bus bars in the first column and the terminal bus bars in the second column may be alternatively arranged along the second direction.

The cell stack may include a plurality of cell groups, each cell group of the plurality of cell groups including one or more unit cells in which the terminal parts having the same polarity face each other in the first direction, and the stack bus bar may extend in the first direction and connect two cell groups of the plurality of cell groups in series, wherein the two cell groups of the plurality of cell groups are adjacent to each other and have the terminal parts of different polarities face each other in the first direction.

Any one of the two cell stacks of the plurality of cell stacks electrically connected to each other through the connection bus bar may include two cell groups of the plurality of cell groups adjacent to each other in the first direction and having the terminal parts of the same polarity face each other in the first direction, and the battery module may further include a cross bus bar crossing the first direction and diagonally connecting one or more unit cells in one of the two cell groups with one or more unit cells in adjacent one of the two cell groups.

The connection bus bar and the cross bus bar may be together connected to the unit cell of the other end of the cell stack opposite from the one end of the cell stack facing the region between the first column and the second column.

The battery module may further include: a coupler provided in the module housing and coupled to an adjacent module housing, an outer wall around an inner space of the module housing, the outer wall including a first wall facing the second direction and a second wall opposite the first wall wherein the coupler includes a connection tunnel at a central portion of the first wall, the connection tunnel protruding in the second direction and having a hollow region into which the module bus bar is configured to extend from the inside of the module housing; and a tunnel insertion hole on the second wall into which the connection tunnel of the adjacent module housing and the module bus bar are configured to be inserted.

The module bus bar connected to the cell stack in the first column and the module bus bar connected to the cell stack in the second column may extend to the outside of the module housing through the connection tunnel.

The coupler may include guide pins at both sides of the connection tunnel on the first wall and protruding in the second direction; guide grooves on the second wall and into which the guide pins of the adjacent module housing are configured to be inserted; and fasteners on the first wall and the second wall, respectively, configured to fasten the first wall of the module housing and the second wall of the adjacent module housing.

The fixing wall may include a separation wall extending in the first direction and being in contact with a side surface of the cell stack; and a pair of end walls respectively extending from both ends of the separation wall in the second direction and configured to engage the cell stack in directions parallel to the first direction, respectively.

A first end wall of the pair of end walls faces the outer wall of the module housing and may be spaced apart from the outer wall along the first direction, and a first impact absorbing space may exist between the first end wall and the outer wall.

A second end wall of the pair of end walls may face an adjacent one of the plurality of receiving parts in the first direction, and a second impact absorbing space may exist between the respective second end walls of the two receiving parts adjacent to each other in the first direction, and the terminal bus bar may extend to overlap the second impact absorbing space.

The cell stack may further include a pair of end supports arranged in the first direction at the one end and the other end of the cell stack, a first end support of the pair of end supports facing the first end wall and a second end support of the pair of end supports facing the second end wall, and the first and second end walls may be curved outwardly in directions parallel to the first direction so that central portions thereof extend away from the first and second end supports, respectively, and the first and second end supports may be recessed inwardly in directions parallel to the first direction so that central portions thereof extend away from the first and second end walls, respectively, and a swelling space exists between the pair of end walls and the corresponding one of the pair of end supports.

The first and second end walls may each include a plurality of first ribs extending in a height direction of the corresponding one of the first and second end walls, where the plurality of first ribs may be spaced apart from each other in the second direction, and the first and second end supports may each include a plurality of second ribs on a surface of the corresponding one of the first and second end supports, the plurality of second ribs being spaced apart from each other in the second direction and in a height direction of the corresponding one of the first and second end supports.

The module housing may have a cooling channel coupled to a bottom surface of the module housing, wherein a coolant is configured to flow through the cooling channel.

Advantageous Effects

According to embodiments of the present invention, by including a plurality of cell stacks, the amount of electric power of the battery may be effectively (or suitably) improved, and the manufacturing process thereof may be efficiently improved while simplifying the constituent components.

DETAILED DESCRIPTION

Figure 1:
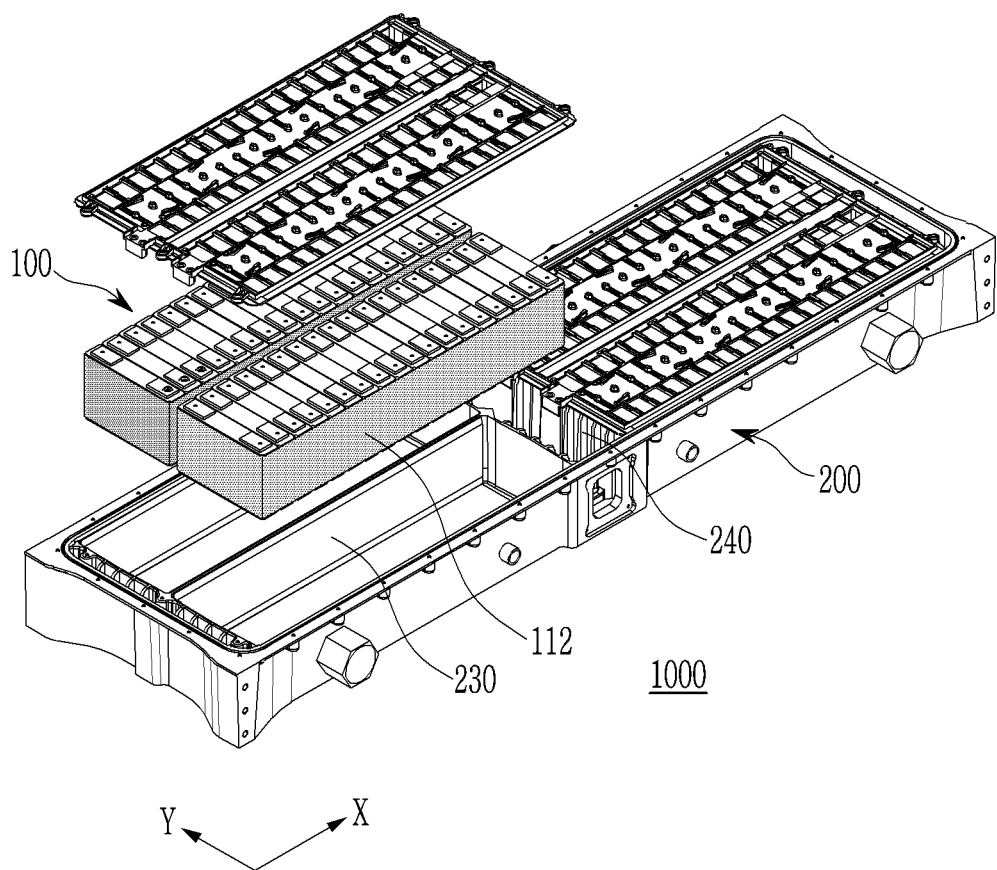
FIG. 1 is a view illustrating a battery module according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification and drawings.

In the present specification, overlapping or duplicative descriptions of the same components will not be provided.

Further, in the present specification, it is to be understood that when one component is referred to as being "connected to" or "coupled to" another component, it may be connected or coupled directly to another component or be connected or coupled to another component with the other component interposed therebetween. On the other hand, in the present specification, it is to be understood that when one component is referred to as being "directly connected to" or "directly coupled to" another component, it may be connected or coupled to another component without any other components interposed therebetween.

In addition, terms used in the present specification are used only in order to describe specific exemplary embodiments rather than limiting the present invention.

Further, in the present specification, singular forms are intended to include plural forms unless the context clearly indicates otherwise.

It should be further understood that terms "include," "have," and "comprise" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Further, in the present specification, a term "and/or" includes a combination of a plurality of stated items or any one of the plurality of stated items. For example, "A and/or B" may refer to "A", "B", or "both of A and B".

In the present specification, expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

As used herein, the term "exemplary embodiment(s)" may refer to "example embodiment(s)" of the present disclosure.

Figure 2:
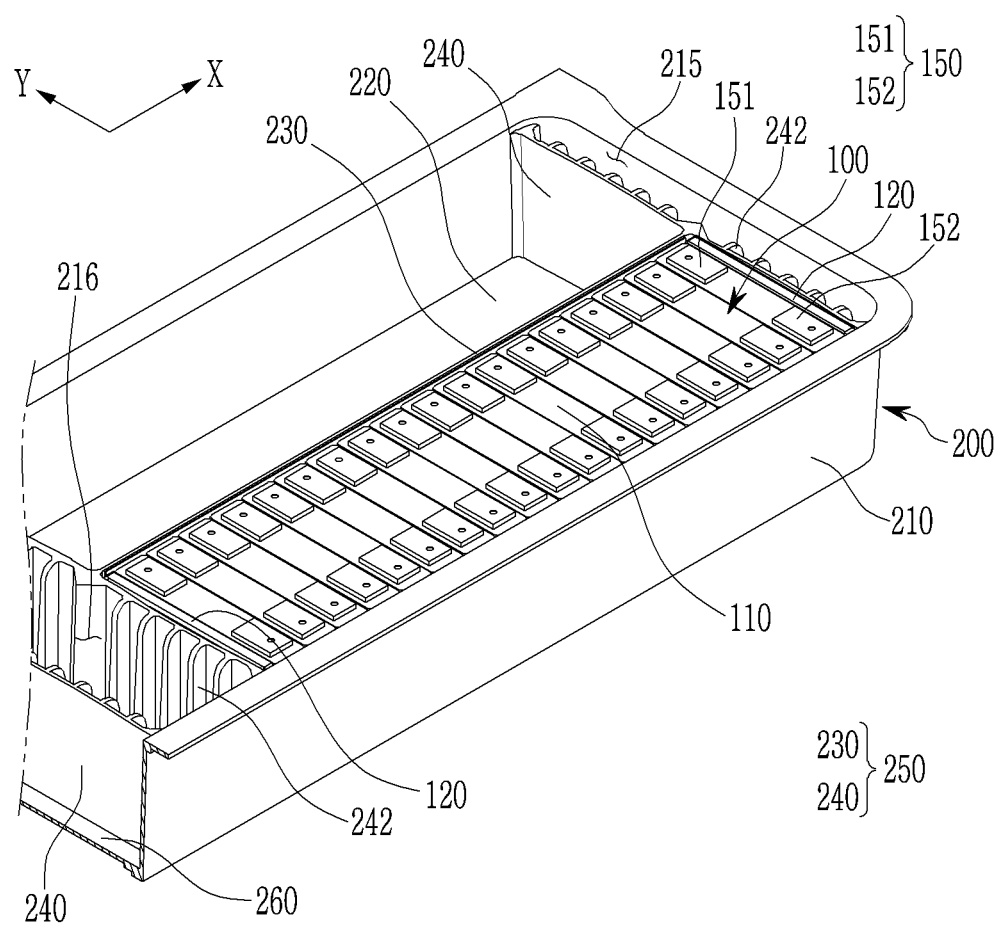
FIG. 2 is a view illustrating a receiving part in the battery module according to an exemplary embodiment of the present invention.

FIG. 1 illustrates a battery module 1000 according to an exemplary embodiment of the present invention and FIG. 2 is a view illustrating a receiving part 220.

As illustrated in FIGS. 1 and 2, the battery module 1000 according to an exemplary embodiment of the present invention includes a cell stack 100 in which a plurality of unit cells 110, each including a terminal part 150, are aligned in a first direction X. The battery module 1000 includes an insulating member 112 around (or surrounding) the plurality of unit cells 110, and a module housing 200 in which a plurality of receiving parts 220 (into which the respective cell stack 100 is inserted) are provided and aligned in the first direction X and a second direction Y, crossing (e.g., perpendicular to) the first direction X. The receiving part 220 includes a fixing wall 250 around (or surrounding) the cell stack 100 and having at least a portion that is in contact with the cell stack 100.

The cell stack 100 includes the plurality of unit cells 110 aligned in the first direction X. The unit cell 110 may include an electrode assembly, corresponding to one secondary battery including the terminal part 150, and may further include a case of a suitable shape, such as a rectangular shape, a cylindrical shape, and/or the like.

Although FIGS. 1 and 2 illustrates the unit cell 110 having a case having a rectangular pillar shape, the unit cell 110 is not necessarily limited thereto. For convenience of explanation, however, the unit cell 110 having the case of the rectangular shape illustrated in FIGS. 1 and 2 will hereinafter be described.

Each of the unit cells 110 may include the terminal part 150 electrically connected to the respective electrode assembly, and the terminal part 150 may be provided as a pair and may be electrically connected to a first electrode and a second electrode of the electrode assembly, respectively. In some embodiments, the terminal part 150 may include a first terminal 151 connected to the first electrode and a second terminal 152 connected to the second electrode.

Although the arrangement and the shape of the terminal part 150 may vary, in an exemplary embodiment of the present invention, the terminal part 150 may be provided on a cap plate coupled to an opening of the case as illustrated in FIG. 1, and a pair of terminal parts 150 having different polarities may be disposed (e.g., positioned) at respective end portions of the cap plate.

In some embodiments, the plurality of unit cells 110 are aligned in the cell stack 100, and an alignment direction of the unit cells 110 may vary. For example, the unit cells 110 may be aligned such that respective wide side surfaces of the unit cells 110 face each other, as illustrated in FIGS. 1 and 2. The alignment direction of the unit cells 110 will hereinafter be defined as the first direction X. In some embodiments, the end supports 120 may be disposed (e.g., positioned) at both ends of the cell stack 100 in the first direction X. However, the embodiments of the present disclosure are not limited thereto, and the unit cells 110 may be disposed at both ends of the cell stack 100 in the first direction X.

In some embodiments, the cell stack 100 includes an insulating member 112 around (or surrounding) the plurality of unit cells 110. The insulating member 112 is formed of an insulating material such as rubber, plastic, and/or the like, and surrounds the plurality of unit cells 110.

The insulating member 112 may also be provided to surround the end supports 120 disposed at both ends of the cell stack 100 in the first direction X together with the plurality of unit cells 110. In some embodiments, the insulating member 112 may surround only the plurality of unit cells 110, without surrounding the end supports 120, and the end supports 120 may be separately disposed at both ends of the cell stack 100.

The insulating member 112 may be provided in a film form (e.g., as a flexible film), or may have a plurality of plate-shaped configurations having rigidity. The insulating member 112 may be provided to surround all four side surfaces of the cell stack 100 or may be disposed only on a portion of any of the four side surfaces, and may also be provided to surround both the upper surface and the lower surface of the cell stack 100. In the embodiments where the insulating member 112 is disposed on the upper surface of the cell stack 100, the insulating member 112 may expose the terminal part 150 of each of the unit cells 110.

FIG. 1 illustrates a structure in which the insulating member 112 is provided in the form of an insulating film and surrounds the side surfaces of the plurality of unit cells 110 in the cell stack 100, and does not surround the end supports 120.

The module housing 200 may include a plurality of receiving parts 220 into which the cell stacks 100 are respectively inserted. FIG. 1 illustrates a structure in which four receiving parts 220 are formed in the module housing 200, and FIG. 2 illustrates two of the receiving parts 220 in the module housing 200 illustrated in FIG. 1. The number of receiving parts 220 formed in the module housing 200 is not limited thereto, however, and may vary.

The module housing 200 has an outer wall 210 extending upwardly from a bottom surface 260 and surrounding the bottom surface 260, and an inner space is formed inside (or by) the outer wall 210. The plurality of receiving parts 220 may be formed in the inner space.

The module housing 200 may have various suitable shapes, without limitation. For example, the module housing 200 according to an exemplary embodiment of the present invention may be provided to have a bottom surface 260 of a substantially rectangular shape as illustrated in FIGS. 1 and 2.

In the module housing 200, an upper portion thereof may be open (e.g., the module housing 200 may not have an upper surface, opposite the bottom surface 260), and accordingly, the receiving part 220 formed in the module housing 200 may also be provided in the form in which an upper portion thereof is open (e.g., without an upper surface). A module cover may be coupled to and seal the opening of the module housing 200, and in embodiments in which the module cover is coupled to the module housing 200, the module cover may constitute an upper surface of the receiving part 220. The module cover may include a bus bar holder for covering the cell stack 100, and bus bars arranged in the bus bar holder to electrically connect the unit cells 110 constituting the cell stack 100.

The plurality of receiving parts 220 formed in the module housing 200 may be aligned in the first direction X and the second direction Y. The second direction Y may be defined as a direction crossing (e.g., perpendicular to) the first direction X on the same plane as the first direction X, as illustrated in FIG. 1, and may be defined as a width direction of the unit cell 110.

FIG. 1 illustrates the module housing 200 in which a total of four receiving parts 220 are formed, with two receiving parts aligned in the first direction X and two receiving parts aligned in the second direction Y are aligned.

FIGS. 1 and 2 illustrates the receiving part 220 according to an exemplary embodiment of the present invention, where the receiving part 220 includes a fixing wall 250 around (or surrounding) the cell stack 100 and having at least a portion that is in contact with the cell stack 100.

Referring to FIG. 2, a structure in which a receiving part 220, into which the cell stack 100 is inserted, and a receiving part 220, into which the cell stack 100 is not inserted, are disposed adjacent to each other is illustrated. The fixing wall 250 corresponds to a boundary wall around (or surrounding) a boundary region of the receiving part 220. Accordingly, all directions (sides) of the cell stack 100 are surrounded by the fixing wall 250, and the cell stack 100 inserted into the receiving part 220 may thus stably maintain a fixed state.

The fixing wall 250 may be variously disposed according to the form of the cell stack 100, and in some embodiments, may be disposed to surround the cell stack 100, with the four surfaces of the fixing wall 250 facing and supporting the four side surfaces in four directions (around the perimeter) of the cell stack 100 as illustrated in FIGS. 1 and 2.

At least a portion of the fixing wall 250 of the receiving part 220 may be in direct contact with the cell stack 100. For example, any one of the surfaces of the fixing wall 250 along the first direction X may be in direct contact with the cell stack 100, and any one of the surfaces of the fixing wall 250 along the second direction Y may be in direct contact with the side surfaces of the plurality of unit cells 110, or with, for example, the insulating member 112.

As described above, according to an exemplary embodiment of the present invention, even though the cell stack 100 does not include a separate fastening component, the cell stack 100 may maintain a shape thereof due the fixing wall 250, and thus may maintain an engaged (e.g., pressed or pressured) state in the first direction X.

In a comparable battery module, a module frame may be coupled to one cell stack, and one cell stack to which the module frame is coupled and which is handled as a unit configuration configures one modules (constitutes one battery module).

Such comparable cell stack may be coupled to the module frame for a performance aspect, such as energy density and/or ease of handling. The module frame coupled to such cell stack may include end blocks pressurizing both ends of the cell stack and side plates extending along side surfaces of the cell stack, where the end blocks and the side plates are coupled to each other in a state in which the cell stack is engaged (e.g., pressed or pressured), thereby making it possible to maintain the structure of the cell stack.

Such comparable battery module has to be provided with a plurality of battery modules in order to meet higher demand for power that cannot be satisfied with one cell stack, and accordingly, a module frame for fastening the cell stacks as a unit body and a plurality of components constituting the module itself are additionally required.

Therefore, a process for manufacturing the comparable battery module may be longer, the consumption for the components may be increased, a weight of the battery module may be increased, and the time and cost required for manufacturing the comparable battery module may be increased.

However, the battery module 1000 according to an exemplary embodiment of the present invention may meet a high power demand with fewer components, since the plurality of cell stacks 100 are mounted in one module. Furthermore, since the cell stack 100 is fixed by the fixing wall 250 of the receiving part 220 that is at least partly distinguishable from the outer wall 210 of the module housing 200, a component for fixing the cell stack 100, such as the module frame, is not separately required.

Figure 3:
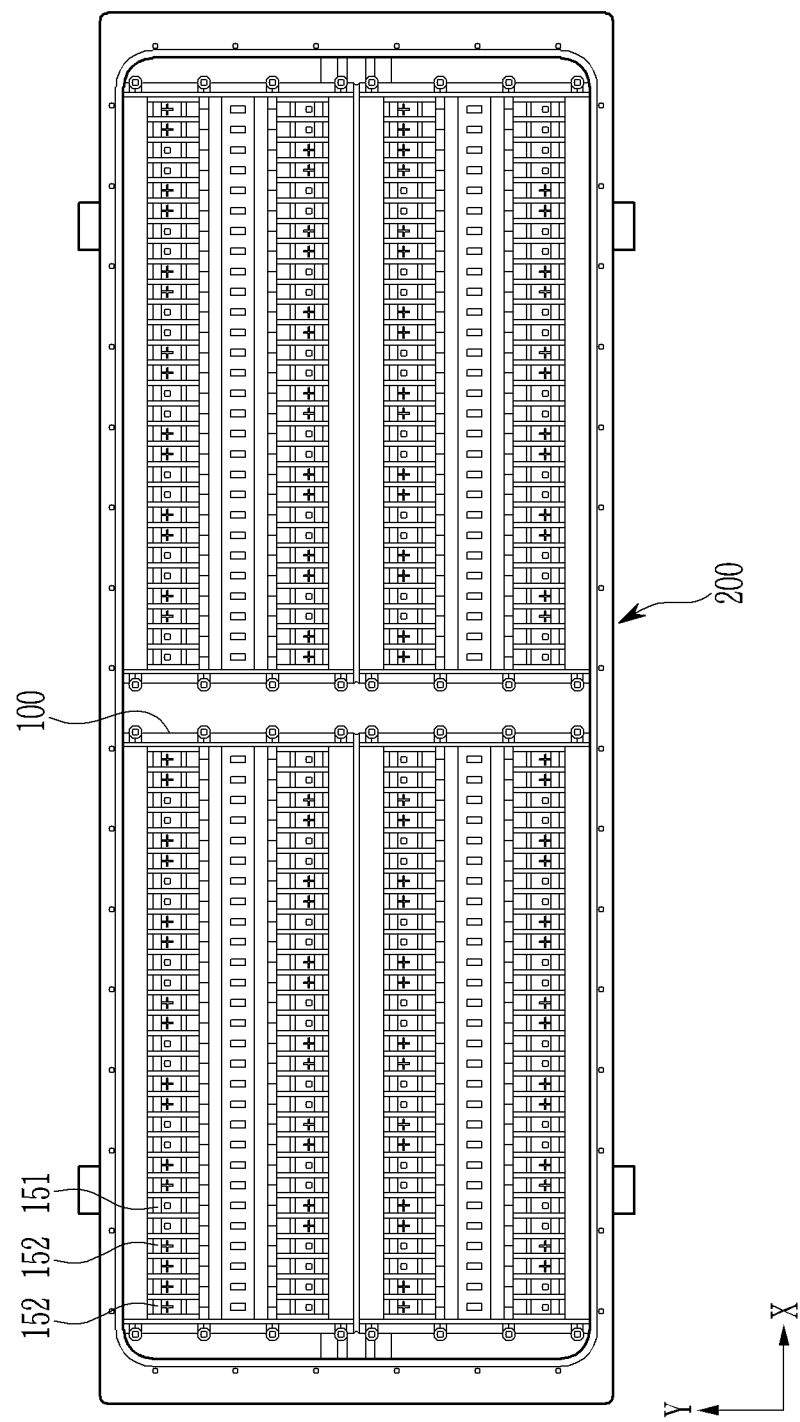
FIG. 3 is a view illustrating a structure in which a plurality of unit cells are disposed (e.g., positioned) in the battery module according to an exemplary embodiment of the present invention.
Figure 4:
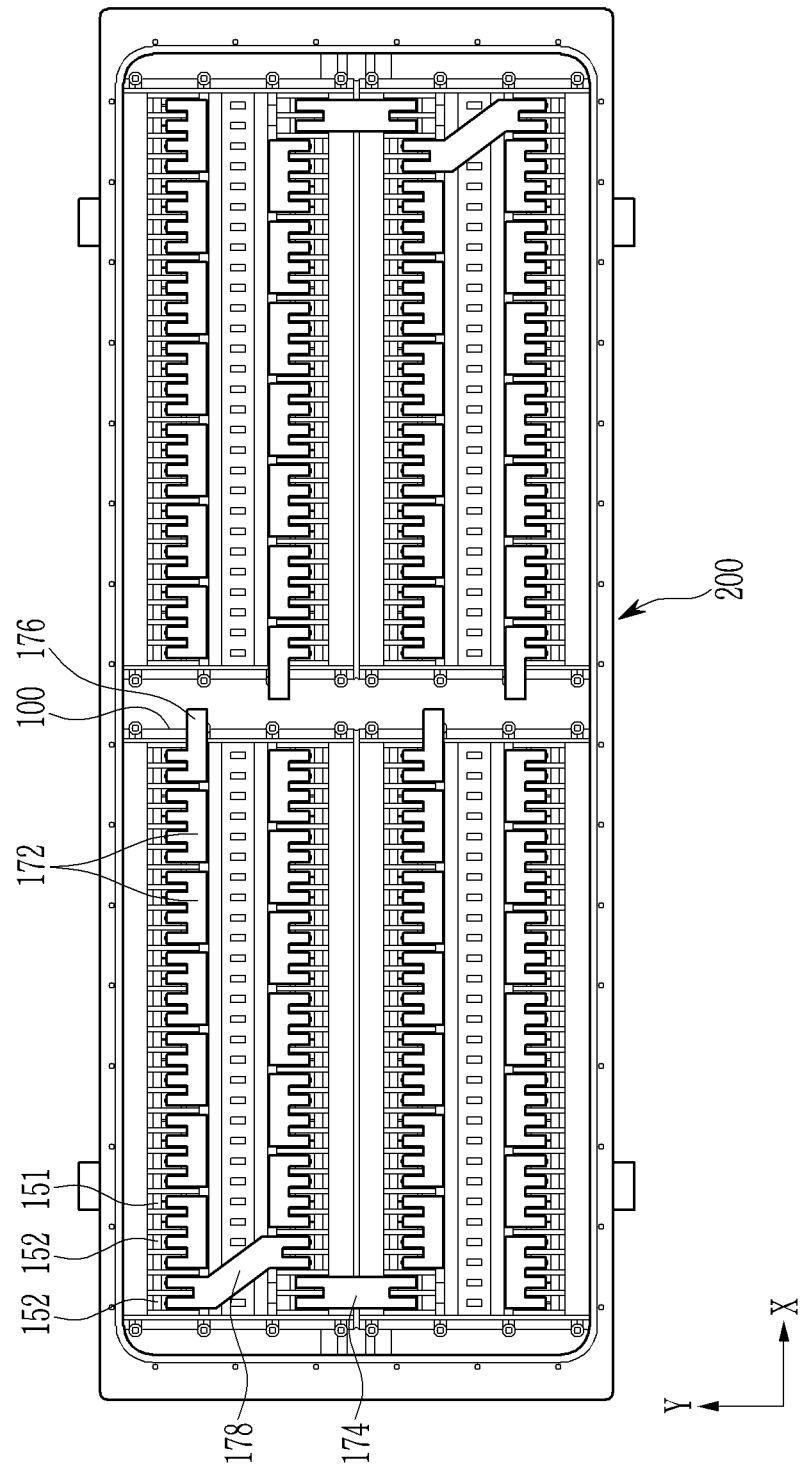
FIG. 4 is a view illustrating a structure in which the plurality of unit cells are connected to each other through a bus bar in the battery module according to an exemplary embodiment of the present invention.

FIG. 3 illustrates a plurality of unit cells 110 inserted into the inner space of the module housing 200 according to an exemplary embodiment of the present invention, and FIG. 4 illustrates an arrangement structure of a bus bar electrically connecting the plurality of unit cells 110 to each other.

As illustrated in FIG. 4, according to an exemplary embodiment of the present invention, the cell stacks 100 adjacent to each other in the second direction Y may be electrically connected to each other, and the cell stacks 100 adjacent to each other in the first direction X may be electrically separated from each other (may not be electrically connected to each other).

The cell stacks 100 adjacent to each other in the second direction Y may be connected in series with or in parallel to each other, and in some embodiments, may be connected to each other partially in series and partially in parallel.

In some embodiments, the cell stacks 100 adjacent to each other in the first direction X may be electrically separated from each other. Referring to FIG. 4, the four cell stacks 100 that are adjacent to each other in the second direction Y may be electrically connected to each other through a connection bus bar 174 to be described herein below, and the cell stacks 100 adjacent to each other in the first direction X may not be electrically connected to each other, and thus have a one-side terminal structure on both sides thereof.

Accordingly, even though the plurality of cell stacks 100 may form a plurality of columns in the first direction X in the present invention, the plurality of cell stacks maintain a state in which they are electrically separated (e.g., disconnected) from each other in the first direction X, and thus it is easy to increase the number of the cell stacks 100, if necessary, and the power provided from the plurality of cell stacks 100 may be effectively (or suitably) provided to an electricity-consuming device.

Figure 14:
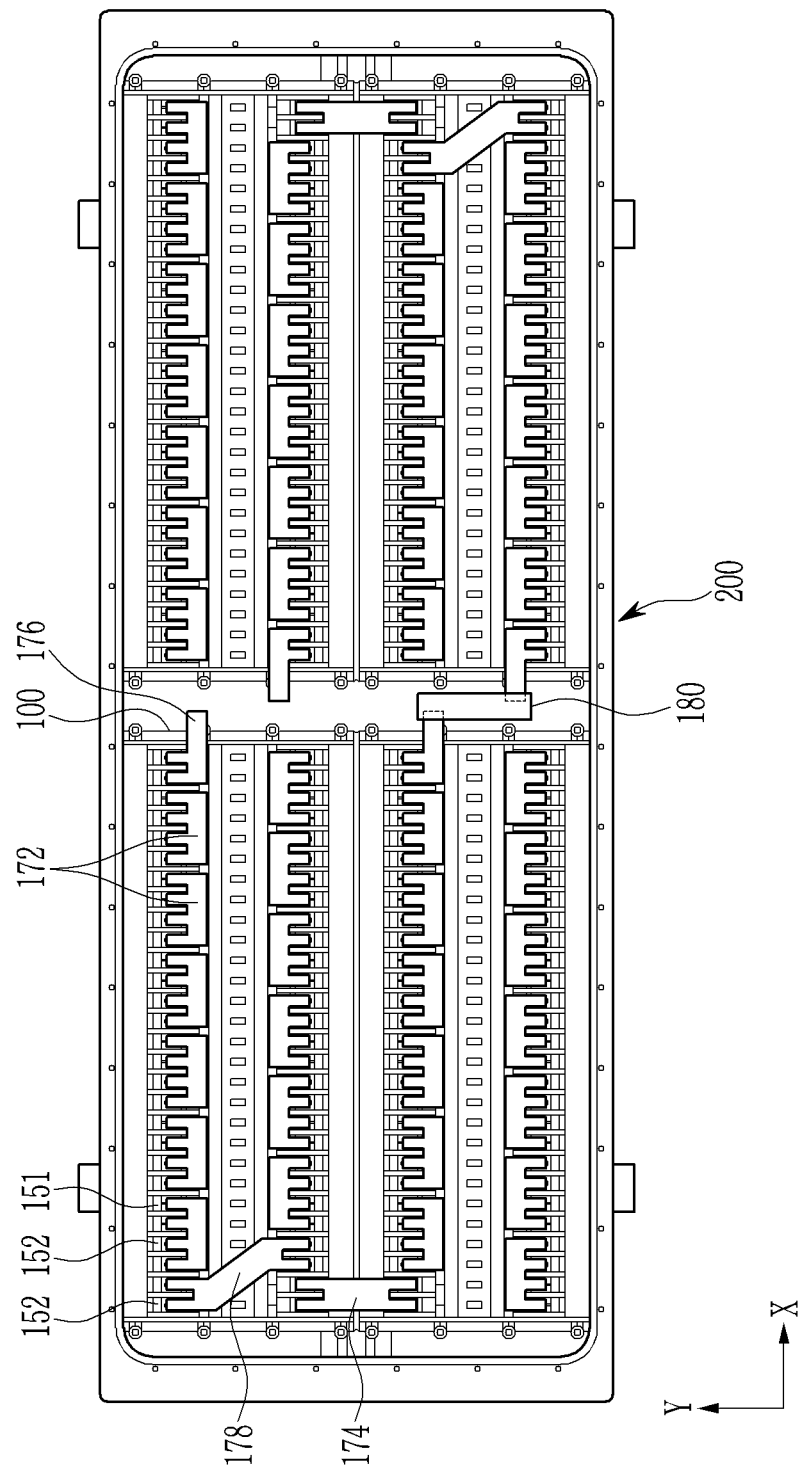
FIG. 14 is a view illustrating a structure in which the plurality of unit cells are connected to each other through a bus bar in the battery module corresponding to an end module according to an exemplary embodiment of the present invention.

In a case in which a plurality of battery modules are coupled to each other to take the form of a large pack as described herein below, a battery module corresponding to an end module disposed at the opposite end of the electricity-consuming device may be provided with a connecting member 180 for electrically connecting the cell stacks 100 adjacent to each other in the first direction X, or may take an electrical connection structure between the cell stacks 100 inside the module housing 200. The connecting member 180 may have a bar shape and connect terminal bus bars 176 of a pair of the cell stacks 100 adjacent to each other in the first direction X, as illustrated in FIG. 14.

Figure 5:
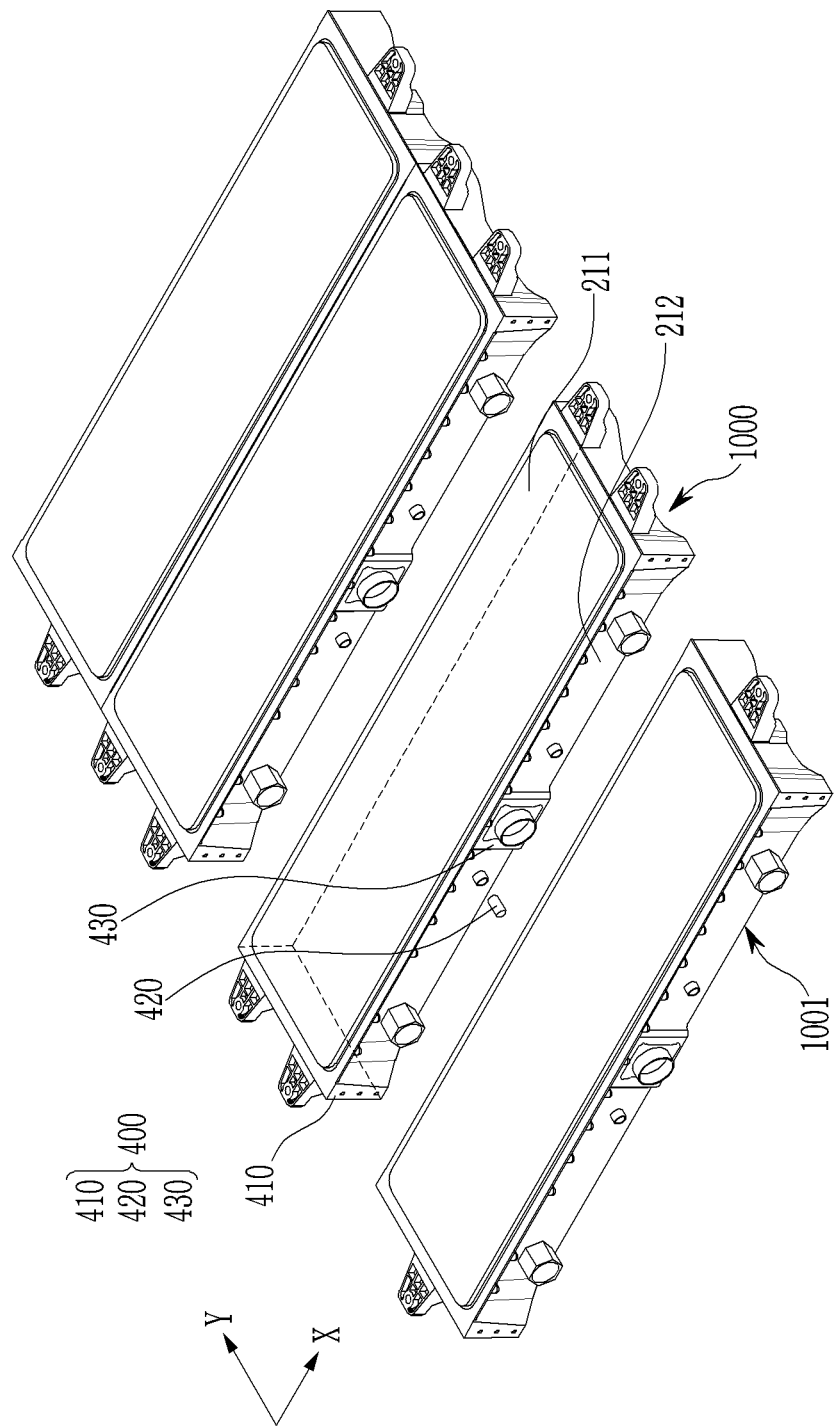
FIG. 5 is a view illustrating a structure in which battery modules according to an exemplary embodiment of the present invention are coupled to each other.
Figure 6:
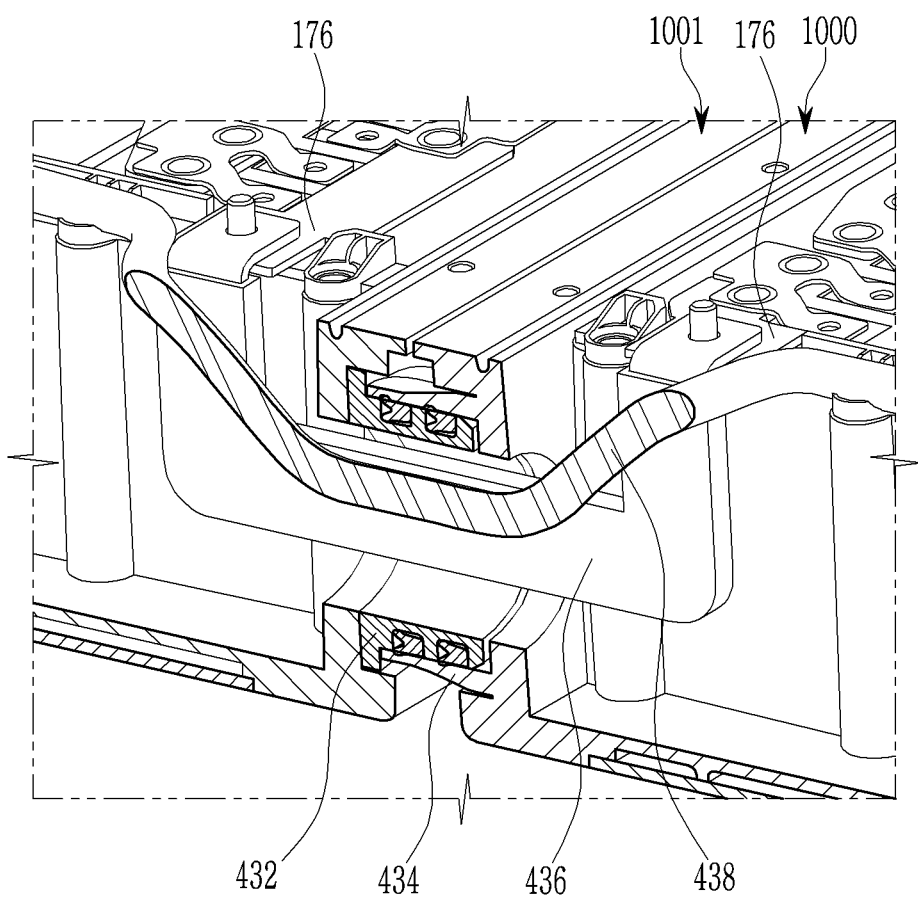
FIG. 6 is a view illustrating a cross section of a connection part in the battery module according to an exemplary embodiment of the present invention.

As illustrated in FIG. 4, the battery module according to an exemplary embodiment of the present invention may further include the stack bus bar 172 electrically connecting the plurality of unit cells 110 to each other in the cell stack 100, the connection bus bar 174 electrically connecting two cell stacks 100 adjacent to each other in the second direction Y, the terminal bus bar 176 extending from the cell stack 100, and a module bus bar 436 connected to the terminal bus bar 176 and extending to the outside of the module housing 200 to be inserted into an adjacent module housing 1001, as illustrated in FIGS. 5 and 6.

The stack bus bar 172 electrically connects the unit cells 110 included in any one cell stack 100 to each other. FIG. 4 illustrates the stack bus bars 172 which are alternately disposed on both sides of the unit cell 110, and which connect a set or predetermined number of unit cells 110 to each other.

In some embodiments, the cell stack 100 may have the plurality of unit cells 110 which are electrically connected to each other through a plurality of stack bus bars 172, and each stack bus bar 172 may include a body portion extending along an arrangement direction of the unit cells 110 (e.g., the first direction X in FIG. 4), and a leg portion protruding from the body portion and connected to the terminal part 150 of each unit cell 110.

The connection bus bar 174 may electrically connect two cell stacks 100 adjacent to each other. In an exemplary embodiment of the present invention illustrated in FIG. 4, two cell stacks 100 that are arranged adjacent to each other in the second direction Y are electrically connected via the bus bar 174 disposed between the two adjacent cell stacks 100 to implement an electrical connection in the second direction Y.

One end portion of the connection bus bar 174 may be connected to the terminal part 150 of the unit cell 110 disposed in any one cell stack 100, and the other end portion of the connection bus bar 174 may be connected to the terminal part 150 provided on the unit cell 110 of the adjacent cell stack 100.

In embodiments where the cell stacks 100 are connected in series with each other, as illustrated in FIG. 4, the unit cells 110 adjacent to each other in the second direction Y may be disposed so that terminal parts having different polarities face each other, and the connection bus bar 174 may connect the terminal parts 150 of the unit cells 110 facing each other in the second direction Y from one side in the adjacent cell stacks 100.

The terminal bus bar 176 may extend from the cell stack 100 to serve as a terminal of a group of the cell stacks 100. For example, in the case in which the two cell stacks 100 are interconnected in the second direction Y, as illustrated in FIG. 4, the terminal bus bar 176 extending from one of the two cell stacks 100 may correspond to an input terminal, and the terminal bus bar 176 extending from the other thereof may correspond to an output terminal.

Such terminal bus bar 176 may effectively (or suitably) implement a coupling with another battery module through the module bus bar 436.

For example, one end portion of the module bus bar 436 may be connected to the terminal bus bar 176 of the corresponding cell stack 100, and the other end portion of the module bus bar 436 may extend externally from the corresponding module housing 200 and may be connected to the terminal bus bar 176 extending from any one cell stack 100 existing in the adjacent module housing 1001.

That is, according to the present invention, even though a plurality of battery modules are connected to each other to implement a pack (e.g., a large pack), an electrical separation relationship between the groups of the cell stacks 100 in different columns is maintained through the structure of the terminal bus bar 176 and the module bus bar 436, and the form of the one-side terminal is maintained. Herein, a "column" may refer to a group of cell stacks arranged in the second direction Y, where the two columns are arranged next to each in the first direction X.

As illustrated in FIG. 4, the terminal bus bar 176 may be connected to the unit cell 110 of one end portion of the cell stack 100, and the connection bus bar 174 may be connected to the unit cell 110 of the other end portion of the same cell stack 100.

The terminal bus bar 176 may be connected externally, e.g., to an adjacent module housing 1001 or an electric consuming device, and the connection bus bar 174 may be a connection means interconnecting the cell stacks 100 adjacent to each other in the second direction Y.

Therefore, according to an exemplary embodiment of the present invention, the terminal bus bar 176 is connected to the unit cell 110 of one end portion of the cell stack 100 and the connection bus bar 174 is connected to the unit cell 110 of the other end portion of the cell stack 100, thereby implementing a structure that effectively connects the plurality of unit cells 110 constituting the cell stack 100 as a whole.

According to an exemplary embodiment of the present invention as illustrated in FIG. 4, the receiving parts 220 are disposed to form a first column and a second column along the second direction Y, and the cell stack 100 is disposed in each column such that one end of the cell stack 100 faces a region between the first column and the second column, and as a result, the terminal bus bar 176 may extend in the region between the first column and the second column.

Hereinafter, the respective columns formed by the receiving parts 220 (or the cell stacks 100) aligned along the second direction Y and spaced apart from each other in the first direction X are defined as the first column and the second column. For convenience of explanation, in FIG. 4, a left column including the receiving parts 220 (or the cell stacks 100) arranged in the second direction Y is referred to as the first column, and a right column is referred to as the second column.

The terminal bus bar 176 may be disposed at one end portion of the cell stack 100. According to an exemplary embodiment of the present invention, a portion of the cell stacks 100 in the first and second columns that face the respective other column in the first direction X corresponds to one end, and thus the terminal bus bar 176 may be disposed between the first column and the second column. As described herein below, a space (e.g., a gap) between the first column and the second column may correspond to a second impact absorbing space 216.

When the terminal bus bar 176 serving as an outside (or outer) terminal in the assembly of the plurality of unit cells 110 is disposed at the side of each of the first column and the second column that faces the center region between the first column and the second column, the module bus bar 436 connected to the terminal bus bar 176 and extending to the outside of the module housing 200 is also easy extended from the center, and accordingly, it is possible to efficiently configure an electrical connection structure between a plurality of battery modules or an electrical connection structure with the electric consuming device.

In the battery module according to an exemplary embodiment of the present invention as illustrated in FIG. 4, the terminal bus bars 176 extending from the cell stacks 100 in the first column and the terminal bus bars 176 extending from the cell stacks in the second column are alternatively disposed along the second direction Y.

Considering the structure according to the present invention in which the receiving parts 220 are aligned in the first direction X and the second direction Y, even though the cell stacks 100 adjacent to each other in the first direction X are electrically separated from each other, there is a possibility that a short circuit occurs due to a high voltage formed in the terminal bus bars 176 when the respective terminal bus bars 176 face each other.

In addition, since the terminal bus bars 176 of the cell stacks 100 disposed in the second direction Y have different polarities, there is a possibility that the short circuit occurs when the cell stacks 100 are disposed too close to each other.

According to the present invention, in order to prevent or reduce the risk of a short circuit situation between the cell stacks 100, even when the plurality of cell stacks 100 form a plurality of columns such as the first column and the second column and are provided in one module housing 200, the terminal bus bars 176 in the first column and the terminal bus bars 176 in the second column do not face each other, and the terminal bus bars 176 in the first column are not disposed adjacent to each other or the terminal bus bars 176 in the second column are not disposed adjacent to each other.

Referring to FIG. 4, the four terminal bus bars 176 at the center may be disposed from the top in the order of the terminal bus bar 176 in the first column, the terminal bus bar 176 in the second column, the terminal bus bar 176 in the first column, and the terminal bus bar 176 in the second column.

Referring again to FIG. 3, in the battery module according to an exemplary embodiment of the present invention, the plurality of unit cells 110 in the cell stack 100 may be divided into a plurality of cell groups including one or more unit cells 110 in which the terminal parts 150 having the same polarity face each other in the first direction X, and the stack bus bar 172 may connect two cell groups adjacent to each other in the first direction X, and in which the terminal parts 150 having different polarities face each other in the first direction X, in series with each other.

The cell stack 100 may include a plurality of unit cells 110, and the plurality of unit cells 110 may configure (e.g., form) the plurality of cell groups and the plurality of cell groups may configure (e.g., form) the cell stack 100. According to an exemplary embodiment of the present invention, the "cell group" may refer to a group of the unit cells 110 in which the terminal parts 150 having the same polarity are disposed to face each other in the first direction X among the plurality of unit cells 110 disposed adjacent to each other in the first direction X.

Referring to FIG. 3, it may be seen that two unit cells 110 in which the terminal parts 150 having the same polarity (for example, the first terminals 151) face each other are disposed adjacent to each other, and the next two adjacent unit cells have the second terminal 152 face each other. Accordingly, the polarity is changed from the first set of two unit cells 110 to the second set of two unit cells 110, and in this exemplary embodiment, the two unit cells 110 form one cell group.

In the embodiment illustrated in FIG. 3, the plurality of cell groups, each including the two unit cells 110, is provided, and the cell groups adjacent to each other are disposed so that the terminal parts 150 having different polarities face each other. In some embodiments, the number of unit cells 110 constituting the cell groups in the entire cell stack 100 may be the same, but the number of unit cells 110 constituting the cell groups are not limited thereto and may vary from one unit cell to a plurality of unit cells, if necessary or desired.

In some embodiments, the stack bus bar 172 connects the terminal parts 150 extending along the first direction X and facing each other in the unit cells 110 adjacent to each other. That is, the unit cells 110 constituting the cell groups are connected in parallel by the stack bus bar 172, and the cell groups adjacent to each other are connected in series.

In some embodiments, the stack bus bar 172 electrically interconnects in parallel the plurality of adjacent terminal parts 150 of the same polarity disposed in the first direction X, and connects in series the two adjacent cell groups in which the terminal parts 150 having different polarities face each other.

In the battery module according to an exemplary embodiment of the present invention, in one of the two cell stacks 100 electrically connected to each other through the connection bus bar 174, the terminal parts 150 of two adjacent cell groups are arranged so that the terminals having the same polarity face each other in the first direction.

In some embodiments, the battery module according to an exemplary embodiment of the present invention may further include a cross bus bar 178 crossing the first direction X and diagonally connecting the two cell groups, in which the terminal parts 150 having the same polarity face each other in the first direction X, in series with each other.

Referring to FIG. 3, in the cell stack 100 illustrated on an upper side of the first column in the drawing, FIG. 3 illustrates a structure in which the cell group to which the connection bus bar 174 is connected and the cell group adjacent thereto are disposed so that the terminal parts 150 having the same polarity, for example, the first terminals 151 face each other in the first direction X.

In addition, FIG. 3 illustrates a structure in which the two cell groups disposed so that the terminal parts having the same polarity face each other in the first direction X are electrically connected to each other by the cross bus bar 178 instead of the stack bus bar 172.

According to embodiments of the present invention, the terminal bus bars 176 are not disposed to be adjacent to each other between the cell stacks 100 adjacent to each other in the second direction Y in order to prevent or reduce the risk of a short circuit between the terminal bus bars 176 due to the high voltage, and the use of the cross bus bar 178 may be advantageous for implementing such an arrangement structure of terminal bus bars 176.

For example, in the cell stack 100 having the same number of unit cells 110 regardless of the number of unit cells 110 constituting the cell group, when the unit cells 110 of the cell stack 100 are electrically connected to each other using only the stack bus bars 172, there may be a case in which the terminal bus bars 176 of the cell stack 100 adjacent to each other in the second direction Y extend to be adjacent to each other.

For example, in a comparable battery module, when a terminal bus bar extends from both a lower side of the cell stack in an upper portion (e.g., upper half) of the first column and an upper side of the cell stack in a lower portion (e.g., lower half) of the first column, the two cell stacks in the first column may be exposed to a risk of a short circuit because the terminal bus bars are adjacent to each other.

However, when in any one of the two cell stacks 100 connected to each other through the connection bus bar 174 (see FIG. 4), adjacent cell groups are disposed so that the terminal parts 150 having the same polarity face each other in the first direction X, and the two cell groups are connected in series with each other in a direction across the first direction X (e.g., diagonally), a situation in which the respective terminal bus bars 176 of the cell stacks 100 adjacent to each other in the second direction Y extend to be adjacent to each other may be prevented or reduced.

According to an exemplary embodiment of the present invention, in the cell stack 100 of each of the upper portions (e.g., upper halves) of the first column and the second column, the cell group to which the connection bus bar 174 is connected and the cell group adjacent thereto are disposed so that the terminal parts 150 having the same polarity face each other in the first direction X, and the cross bus bar 178 crosses the first direction X and connects the two cell groups in the series form.

In embodiments of the present disclosure, when a pair of cell groups adjacent to each other are disposed so that the terminal parts 150 having the same polarity face each other, and are connected in series with each other using the cross bus bar 178, the terminal bus bars 176 at the same position of the cell stacks 100 provided in the first column are extended, thereby preventing or reducing a situation in which the terminal bus bars 176 are disposed to be adjacent to each other.

As illustrated in FIG. 4, in the battery module according to an exemplary embodiment of the present invention, the connection bus bar 174 and the cross bus bar 178 may be connected to the unit cell 110 of the other end portion of the cell stack 100. Accordingly, according to an exemplary embodiment of the present invention, the arrangement structure of the connection bus bar 174, the stack bus bar 172, and the cross bus bar 178 may be more effectively set.

FIG. 5 illustrates a structure in which a plurality of battery modules according to an exemplary embodiment of the present invention are provided and are interconnected. That is, FIG. 5 illustrates a structure in which the battery modules are coupled to each other to form a pack.

As illustrated in FIG. 5, the battery module according to an exemplary embodiment of the present invention may further include a coupling part 400 provided in the module housing 200 and coupled to the adjacent module housing 1001.

In some embodiments, the coupling part 400 may include a connection tunnel 432 (see FIG. 6) positioned at a central portion of a first wall 211 facing the second direction Y from among the outer wall 210 around (or surrounding) the inner space of the module housing 200, protruding in the second direction Y, and having a hollow region into which the module bus bar 436 is extended from the inside of the module housing 200. The coupling part 400 may further include a tunnel insertion hole 434 disposed in a second wall 212 positioned opposite to and facing the first wall 211 among the outer wall 210, and into which the connection tunnel 432 of the adjacent module housing 1001 and the module bus bar 436 are inserted.

The battery modules 1000 may be coupled to each other to meet the required (or desired) power, thereby making it possible to realize a pack structure. FIG. 6 illustrates a structure in which the coupling parts 400 between the corresponding module housing 200 and the adjacent module housing 1001 are coupled to each other.

The coupling part 400 may be provided in various types (or kinds) and shapes, without limitation. For example, FIG. 5 illustrates fastening parts 410 fastened to each other through a fastening member 415, guide parts 420 aligning positions of the respective fastening parts 410 of the corresponding battery module and the adjacent battery module, and connection parts 430, which are connection passages of the module bus bar 436 for electrical connection with the adjacent module housing 1001 according to an exemplary embodiment of the present invention.

As illustrated in FIG. 5, in the battery module 1000 according to an exemplary embodiment of the present invention, the coupling parts 400 may be provided on the first wall 211 and the second wall 212 positioned along the second direction Y among the outer wall 210 of the module housing 200, and the coupling part 400 provided on the second wall 212 of the module housing 200 may be coupled to the coupling part 400 provided on the first wall 211 of the adjacent module housing 1001.

For example, in the battery module 1000 according an exemplary embodiment of the present invention, since the plurality of cell stacks 100 are inserted thereinto and the cell stacks 100 include the plurality of unit cells 110 aligned in the first direction X, the module housing 200 may have a cross section of a rectangular shape elongated in the first direction X.

Accordingly, the coupling parts 400 may be disposed on the first wall 211 and the second wall 212 positioned in the second direction Y among the outer wall 210 of the module housing 200 so that an entire length of the plurality of module housings 200 may be reduced.

The coupling part 400 disposed on the first wall 211 of any one of the module housings 200 may be coupled to the coupling part 400 disposed on the second wall 212 of the other of the module housings facing the first wall 211, and the coupling part 400 disposed on the second wall 212 of any one of the module housings 200 may be coupled to the coupling part 400 disposed on the first wall 211 of the other of the module housings 1001 facing the second wall 212.

FIG. 6 illustrates a structure of the connection part 430 according to an exemplary embodiment of the present invention (FIG. 6 is a cross-section of the two coupled module housings in FIG. 5 along the second direction Y, where the connection part 430 may include the connection tunnel 432 of the first wall 211 and the tunnel insertion hole 434 of the second wall 212.

As illustrated in FIG. 6, according to an exemplary embodiment of the present invention, the coupling part 400 may further include the connection tunnel 432 positioned on the first wall 211, protruding in the second direction Y, and having a hollow form in which the module bus bar 436 is extended from the inside of the module housing 200, and the tunnel insertion hole 434 positioned on the second wall 212 and into which the connection tunnel 432 of the adjacent module housing 1001 and the module bus bar 436 are inserted.

In an exemplary embodiment of the present invention, in a case in which two or more module housings 200 are coupled to each other, a connection of the module bus bars 436 may be required for the cell stacks 100 of each module housing 200 to be electrically connected to each other. In a case in which the module housing 200 itself is provided with a control module for controlling a cooling performance or monitoring the unit cell 110, connection lines 438 for transmitting and receiving management control signals of the respective control modules should be connected to each other.

According to an exemplary embodiment of the present invention, the connection part 430 may be included in the coupling part 400, and connection members for electrical connection or information connection between the two module housings 200 through the connection part 430 may be connected into the two module housings 200.

The connection tunnel 432 may protrude in the second direction Y from the first wall 211. The position of the connection tunnel 432 on the first wall 211 may vary, and according to an exemplary embodiment of the present invention, the connection tunnel 432 may be disposed at the center portion of the first wall 211. The connection tunnel 432 may have a cylindrical shape having a hollow region penetrating through the first wall 211, and the module bus bar 436 or the connection line 438 may be led (or extend) to the outside from the inside of the module housing 200 through the hollow region therein.

The module bus bar 436 extending through the connection tunnel 432 may be inserted into the adjacent module housing 1001 through the tunnel insertion hole 434 provided in the adjacent module housing 1001, and may be electrically connected to the plurality of cell stacks 100 existing in the inner space of the adjacent module housing 1001.

FIG. 6 illustrates a structure of the module bus bar 436 disposed to penetrate through the hollow region of the connection tunnel 432, and having one end portion connected to the terminal bus bar 176 in any one of the module housings 200 and the other end portion connected to the terminal bus bar 176 in the adjacent module housing 1001.

The module bus bar 436 may be first bent and connected to two different terminal bus bars 176, and then inserted into the hollow region of the connection tunnel 432, or may be bent and coupled to the two different terminal bus bars 176 after being inserted into the hollow region of the connection tunnel 432.

In some embodiments, the tunnel insertion hole 434 penetrates through the second wall 212 to communicate the inside and the outside of the module housing 200 with each other (e.g., to form a passage between the inside and the outside of the module housing 200). A cross section shape and position of the tunnel insertion hole 434 may correspond to those of the connection tunnel 432.

The coupling part 400 may include the connection part 430, such that an electrical connection and a signal connection may be easily performed when the adjacent module housings 200 are coupled to each other, and the connection members such as the module bus bar 436 and the connection line 438 for electrical connection and signal connection may be effectively (or suitably) coupled to each other without being exposed to the outside when the adjacent module housing 1001 is coupled thereto.

According to an exemplary embodiment of the present invention, the module bus bar 436 connected to the cell stack 100 in the first column and the module bus bar 436 connected to the cell stack 100 in the second column may be extended to the outside of the module housing 200 through the connection tunnel 432.

That is, the module bus bar 436 in the first column and the module bus bar 436 in the second column are separated from each other, and the two module bus bars 436 are led (extended) together from one module housing 200 through the connection tunnel 432. Due to this structure, even though the plurality of battery modules are coupled to each other, the cell stacks 100 in the first column and the second column may be electrically separated from each other to thereby implement the one-side terminal form.

Figure 7:
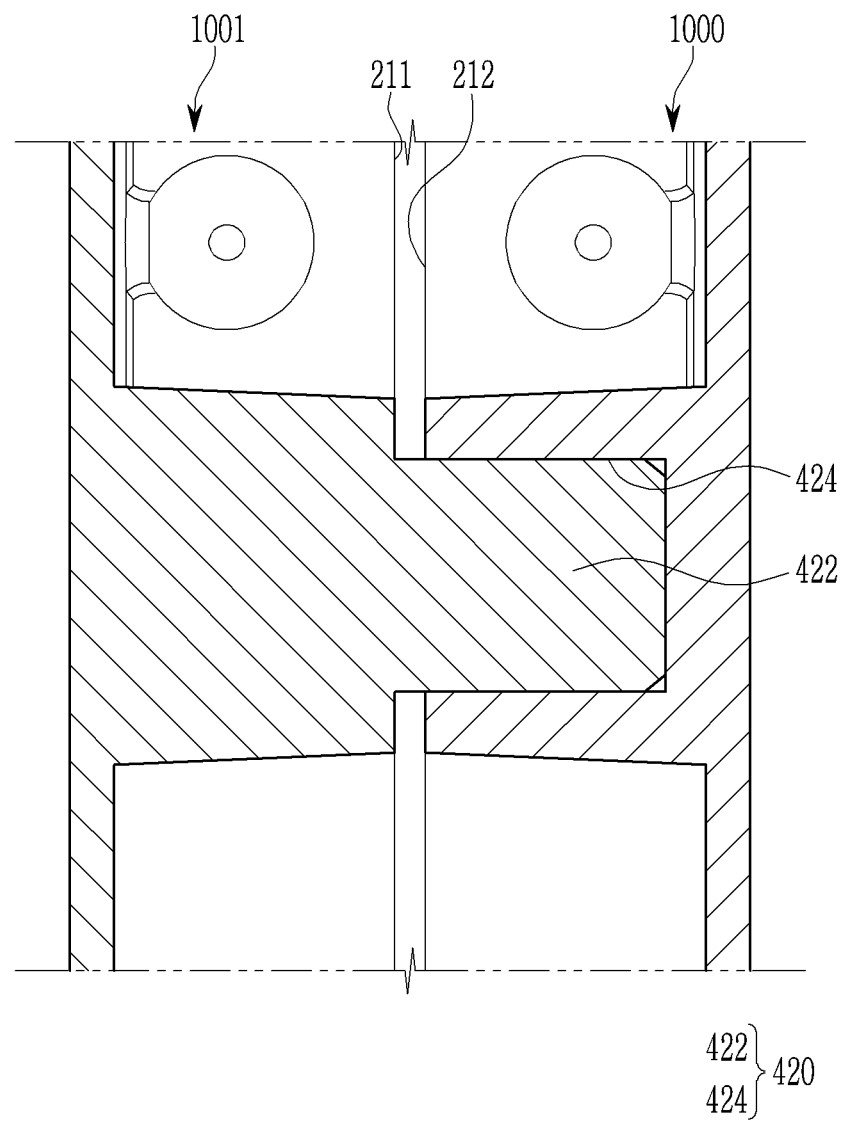
FIG. 7 is a view illustrating a cross section of a guide part in the battery module according to an exemplary embodiment of the present invention.
Figure 8:
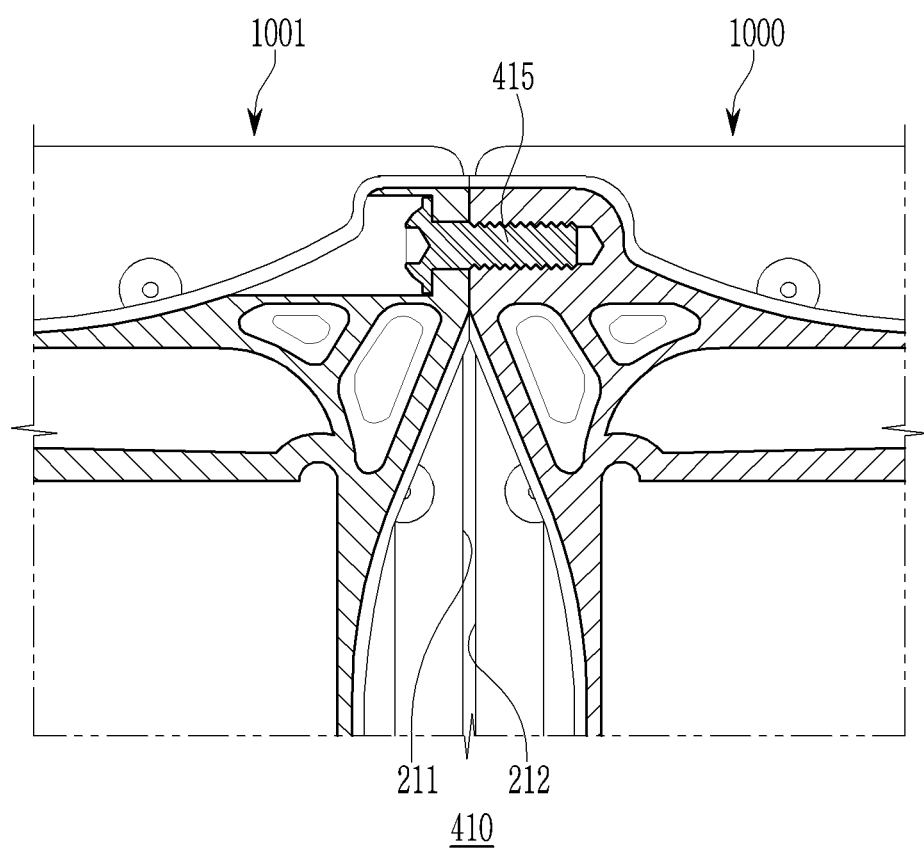
FIG. 8 is a view illustrating a cross section of a fastening part in the battery module according to an exemplary embodiment of the present invention.

FIG. 7 illustrates a structure in which a guide pin 422 and a guide groove 424 according to an exemplary embodiment of the present invention are coupled to each other, and FIG. 8 illustrates a structure of the fastening part 410.

As illustrated in FIGS. 7 and 8, according to an exemplary embodiment of the present invention, the coupling part 400 may further include guide pins 422 disposed at both sides of the connection tunnel 432 on the first wall 211 and protruding in the second direction Y, guide grooves 424 positioned on the second wall 212 and into which the guide pins 422 of the adjacent module housing 1001 are inserted, and fastening parts 410 formed on the first wall 211 and the second wall 212, respectively, to fasten the first wall 211 and the second wall 212 of the adjacent module housings to each other.

The guide part 420 may include the guide pin 422 and the guide groove 424. The guide pin 422 and the guide groove 424 may be disposed on the first wall 211 and the second wall 212 of the module housing 200, respectively. For example, the guide pin 422 may be disposed on the first wall 211 and the guide groove 424 may be disposed on the second wall 212.

According to an exemplary embodiment of the present invention, a fixed relationship between (e.g., a fixed structure of) the corresponding module housing 200 and the adjacent module housing 1001 may be formed by the fastening part 410, and the guide part 420 may be provided so that the fastening part 410, to which a fastening member 415 is coupled, may maintain a stable fastening position.

The guide pin 422 may be formed to externally protrude along the second direction Y from the first wall 211 of the module housing 200.

The guide pin 422 may be manufactured separately from the module housing 200 and coupled to the first wall 211, and may also be formed integrally with the module housing 200. The guide pin 422 may have various shapes.

The guide groove 424 may have the form of a groove recessed inwardly along the second direction Y on the second wall 212 of the module housing 200. A shape of a cross section of the guide pin 422 may correspond to a shape of a cross section of the guide groove 424.

In some embodiments, the guide pin 422 provided on the first wall 211 of the adjacent module housing 1001 is inserted into the guide groove 424 provided in the second wall 212 of any one of the module housings 200, and is coupled thereto.

In a process in which the guide pin 422 is inserted into the guide groove 424, the module housing 200 and the adjacent module housing 1001 form a stable coupling position, and accordingly, the respective fastening parts 410 of the corresponding module housing 200 and the adjacent module housing 1001 may be aligned at positions at which they face each other and may be fastened to each other.

According to an exemplary embodiment of the present invention, the coupling part 400 includes the guide part 420 together with the fastening part 410, thereby making it possible to easily (or more easily) achieve a suitable arrangement state for coupling the two or more module housings to each other.

As illustrated in FIG. 8, the fastening part 410 may correspond to a region in which the corresponding module housing 200 and the adjacent module housing 1001 are fastened to each other and are fixed, by utilizing the plurality of components of the coupling part 400.

The fastening parts 410 may be provided on the first wall 211 and the second wall 212 of the module housing 200, respectively, and may be provided at both end portions of the first wall 211 and the second wall 212, respectively, as illustrated in FIG. 5, for example.

The fastening part 410 provided on the second wall 212 of any one of the module housings 200 may be fastened to the fastening part 410 provided on the first wall 211 of the adjacent module housing 1001, and the fastening member 415 may fasten (e.g., couple) the fastening parts 410 to each other.

The fastening part 410 may have various types (or kinds) and shapes. According to an exemplary embodiment of the present invention (e.g., in a battery module of FIG. 4), a fastening hole through which the fastening member 415 penetrates may be formed in the fastening part 410, and the fastening member 415 may penetrate through the respective fastening holes provided in a pair of fastening parts 410 and be fixed to couple the corresponding module housing 200 and the adjacent module housing 1001 to each other.

The fastening member 415 may be provided in various types (or kinds) and shapes, for example, FIG. 8 illustrates the fastening member 415 provided in the form of a bolt penetrating through the fastening hole according to an exemplary embodiment of the present invention.

In the battery module 1000 according to an exemplary embodiment of the present invention, the fastening parts 410 may be disposed at both end portions of the first wall 211 and the second wall 212 (e.g., FIG. 5), respectively, the connection tunnels 432 and the tunnel insertion holes 434 may be disposed at the central portion of the first wall 211 or the second wall 212, guide pins 422 may be disposed between the fastening part 410 and the connection tunnel 432, respectively, and the guide grooves 424 may be disposed between the fastening part 410 and the tunnel insertion hole 434, respectively.

According to an exemplary embodiment of the present invention, the fastening parts 410 may be disposed at both end portions of the first wall 211 and the second wall 212, so that structure stability may be improved by the fastening parts 410. In some embodiments, a plurality of guide parts 420 (for example, a pair of guide parts 420) may be disposed at either side of the respective central portions of the first wall 211 and the second wall 212, so that a guide effect by the guide parts 420 is increased.

The connection part 430 may be disposed at the central portions of the first wall 211 and the second wall 212, respectively, to easily lead and connect the module bus bar 436 and the connection line 438. However, positional characteristics of the components of the coupling part 400 may be changed, if necessary.

Figure 15:
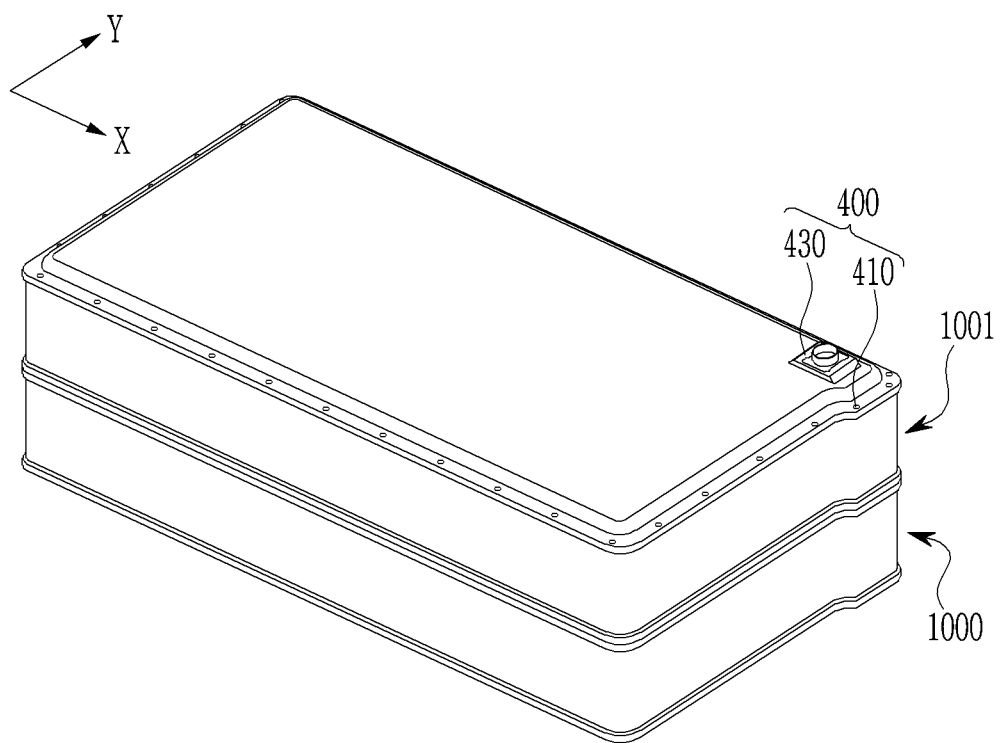
FIG. 15 is a view illustrating a structure in which battery modules according to another exemplary embodiment of the present invention are coupled to each other.

FIG. 15 illustrates a figure in which a plurality of battery modules according to another exemplary embodiment of the present disclosure are provided and are interconnected. That is, FIG. 15 illustrates a figure in which the battery modules are coupled to each other to form a large pack (e.g., a battery pack).

As shown in FIG. 15, the coupling parts 400 are formed on the upper surface (or module cover) and the bottom surface of the battery module, and the coupling parts 400 between the battery modules adjacent to each other are coupled to each other. Accordingly, the plurality of battery modules may be stacked in the vertical direction (directions perpendicular to the first direction X and the second direction Y) through the coupling parts 400.

For example, the connection part 430 (e.g., the connection tunnel) disposed on the upper surface of the battery module 1000 may be inserted into the connection part 430 (e.g., the tunnel insertion hole) disposed on the bottom surface of the adjacent battery module 1001. In addition, the connection parts 430 may be connection passages of the module bus bar and the connection line.

Referring again to FIGS. 1 and 2, in the battery module according to an exemplary embodiment of the present invention, the fixing wall 250 may include a separation wall 230 that crosses the inner space surrounded by the outer wall 210 of the module housing 200 in the first direction X and is in contact with side surfaces of the cell stack 100, and end walls 240 disposed at both ends of and crossing the separation wall 230 in the first direction X, to engage (e.g., press or pressure) end surfaces of the cell stack 100 in directions parallel to the first direction X, respectively.

The separation wall 230 may extend in the first direction X, and may partition the inner space surrounded by the outer wall 210 to form a plurality of receiving parts 220. In some embodiments, the separation wall 230 may constitute a portion of the fixing walls 250 of the two receiving parts 220 disposed at both sides of the separation wall 230 along the second direction Y, and may be in contact with the respective side surfaces of the cell stacks 100 inserted into each of the two receiving parts 220.

The side surfaces refer to both side surfaces of the cell stack extending along the first direction X, that is, both side surfaces of the cell stack 100 arranged in the second direction Y, and as described above, since the cell stack 100 according to the present invention does not include a separate module frame, the side surfaces may correspond to the insulating member 112 around (or surrounding) the side surfaces of the plurality of unit cells 110.

The separation wall 230 may protrude upwardly from a bottom surface 260 of the module housing 200, and may extend along the first direction X to divide the inner space of the module housing 200. That is, the separation wall 230 may correspond to a portion of the fixing wall 250 around (or surrounding) the receiving part 220, and may constitute one surface thereof.

Referring to FIGS. 1 and 2, the receiving parts 220 may be formed at both sides of the separation wall 230, and the separation wall 230 may thus become the fixing wall 250 for the two receiving parts 220 formed at both sides thereof.

Referring to FIG. 2, the separation wall 230 may face the side surface of the cell stack 100 inserted into the receiving part 220, and accordingly, the separation wall 230 corresponding to a portion of the fixing wall 250 may be in direct contact with at least a portion of the side surface of the cell stack 100 inserted into the receiving part 220 to thereby support the cell stack 100 in the second direction Y.

The end walls 240 may extend along the second direction Y, may be disposed at both ends of each of the plurality of receiving parts 220 in the first direction X to each engage (e.g., press or pressure) the end surfaces of both sides of the cell stack 100 in the first direction X and in the direction opposite to the first direction X, and may correspond to a portion of the fixing wall 250.

In the present invention, the side surfaces of both ends of the cell stack 100 in the first direction X are defined as the end surfaces, respectively. According to an exemplary embodiment of the present invention, the end surface may correspond to the insulating member 112 or one surface of the end support 120.

FIGS. 1 and 2 illustrate a structure in which the end walls 240 are disposed at both sides of the cell stack 100 in the first direction X. A plurality of end walls 240 may exist in the module housing 200 and may correspond to both sides of the fixing wall 250 of the receiving part 220 in the first direction X.

The end wall 240 may be distinguishable from the outer wall 210 of the module housing 200. For example, the end wall 240 may protrude from the bottom surface 260 in the inner space of the module housing 200 and extend along the second direction Y, and a plurality of end walls 240 may be disposed so as to be spaced apart from the outer wall 210 or the other end wall 240.

FIG. 1 illustrates a structure in which a plurality of receiving parts 220, for example, a total of four receiving parts 220, are provided, where two receiving parts 220 are arranged in the first direction X and two receiving parts 220 are arranged in the second direction Y. One separation wall 230 crosses a portion of the inner space of the module housing 200 in the first direction X and four end walls 240 extend in the second direction Y.

The separation wall 230 is shared by the receiving parts 220 arranged in the second direction Y and disposed at both sides of the separation wall 230. The end walls 240, however, are not shared by the receiving parts 220 arranged in the first direction X, and the respective end walls 240 of the receiving parts 220 arranged in the first direction X are disposed to be spaced apart from each other in the first direction X.

A pair of end walls 240 disposed at both sides of the receiving part 220 in the first direction X may be in direct contact with the end surfaces of the cell stack 100 and/or, for example, at least a portion of one surface of the end support 120. In addition, the end wall 240 may be disposed to engage (e.g., press or pressure) the cell stack 100 in the first direction X and in the direction opposite to the first direction X.

In an exemplary embodiment of the present invention, the cell stack 100 inserted into the receiving part 220 is not fastened to a module frame such as an end block and/or the side plate, but instead is provided in the form in which the side surfaces thereof are surrounded by the insulating member 112 (where the plurality of unit cells 110 are aligned to form the cell stack 100), and in the battery module 1000 according to an exemplary embodiment of the present invention, the end walls 240 may serve to engage and fix the cell stack 100 in the first direction X and in the direction opposite to the first direction X.

The cell stack 100 is engaged in the first direction X and in the direction opposite to the first direction X to provide higher battery power under the same volume, and may be maintained in a structurally stable state.

The cell stack 100 may be inserted inside the fixing walls 250 of the receiving part 220, for example, between a pair of end walls 240 provided on both sides of the cell stack 100 in the first direction X, in an engaged (e.g., pressed or pressured) state. For example, a jig may be inserted into the receiving part 220 in a state in which the end surfaces of the cell stack are engaged.

Figure 9:
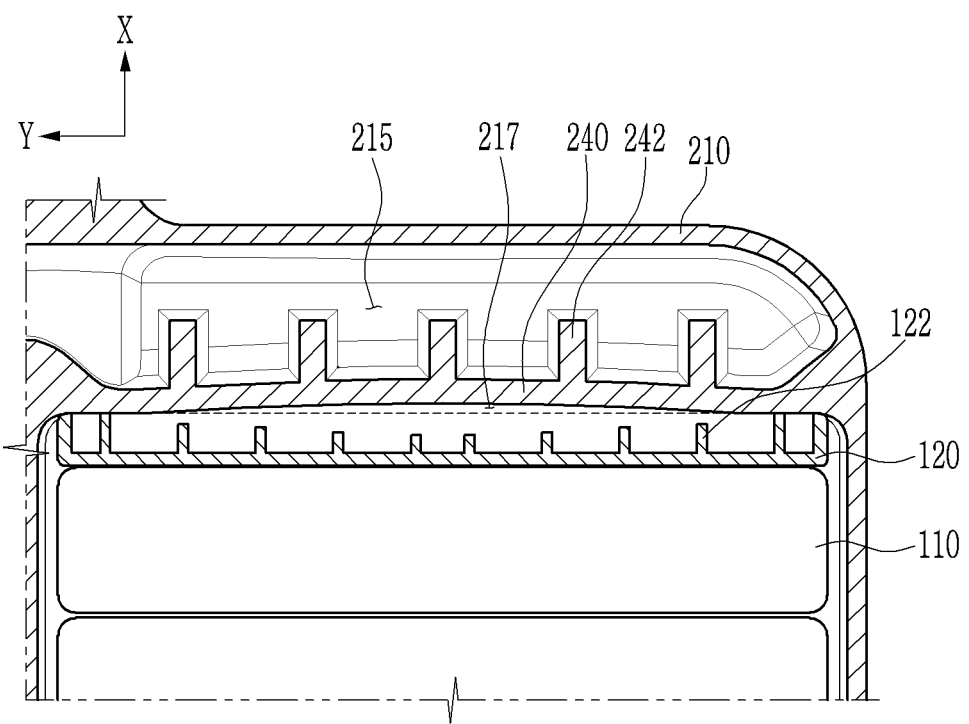
FIG. 9 is a view illustrating an end wall and an end support in the battery module according to an exemplary embodiment of the present invention.

FIG. 9 illustrates a cross section of the end wall 240 spaced apart from the outer wall 210 of the module housing 200. As illustrated in FIG. 9, in an exemplary embodiment of the present invention, the end wall 240 may be disposed so that one surface thereof faces the outer wall 210 of the module housing 200 and is spaced apart from the outer wall 210 along the first direction X, thereby making it possible to form a first impact absorbing space 215 between the outer wall 210 and the end wall 240.

In an exemplary embodiment of the present invention, a plurality of end walls 240 may be provided as illustrated in FIGS. 1 and 2, and the end wall 240 facing the outer wall 210 among the plurality of end walls 240 is spaced apart from the outer wall 210 of the module housing 200 that faces the end wall 240 in the first direction X, as illustrated in FIG. 9, thereby making it possible to form the first impact absorbing space 215 between the outer wall 210 of the module housing 200 and the end wall 240.

FIG. 9 illustrates a top view of the end wall 240 facing the outer wall 210 of the module housing 200 among the end walls 240 constituting the fixing wall 250 of the receiving part 220, and illustrates a structure in which the first impact absorbing space 215 is formed between the end wall 240 and the outer wall 210.

The module housing 200 needs to safely protect the cell stack 100 inserted into the receiving part 220 against impacts delivered from the outside, and in an exemplary embodiment of the present invention, the end wall 240 which is in direct contact with the end surface of the cell stack 100 to support and engage the cell stack 100 may be spaced apart from the outer wall 210 to prevent or reduce the impact delivered to the outer wall 210 from being directly delivered to the end wall 240.

In addition, a proper cooling is important for the unit cell 110 that generates heat during use, and the first impact absorbing space 215 itself may suitably serve as a heat dissipating space in which the heat of the cell stack 100 is dispersed.

In an exemplary embodiment of the present invention, as illustrated in FIGS. 1 and 2, a plurality of receiving parts 220 may be disposed in the inner space of the module housing 200 along the first direction X, and in the two receiving parts 220 adjacent to each other along the first direction X, the respective end walls 240 facing each other in the first direction X may be spaced apart from each other, thereby making it possible to form a second impact absorbing space 216 between the end walls 240. In addition, the terminal bus bar 176 may be led (extended) to the second impact absorbing space 216.

In the two receiving parts 220 adjacent to each other in the first direction X of FIG. 1, the surfaces of the respective fixing walls 250 that face each other correspond to the respective end walls 240, and the two receiving parts 220 have different end walls 240 facing each other. That is, the receiving parts 220 arranged in the first direction X do not share the end walls 240.

Referring to FIG. 2, in the two receiving parts 220 aligned in the first direction X, the end walls 240 facing each other are spaced apart from each other, and the second impact absorbing space 216 is formed between the end walls 240.

The second impact absorbing space 216 protects the cell stack 100 inserted into the corresponding receiving part 220 from the impact delivered from the outside of the receiving part 220, similar to the first impact absorbing space 215. For example, the first impact absorbing space 215 may prevent or reduce the impact delivered to the outer wall 210 of the module housing 200 from being delivered to the inner space of the module housing 200, and the second impact absorbing space 216 may prevent or reduce the impact delivered to any one of the receiving parts 220 from being delivered to the other receiving part 220 adjacent to the first receiving part 220 in the first direction X.

In an exemplary embodiment of the present invention, the terminal bus bars 176 may be led (extended) from the cell stacks 100 in the first column and the second column and may be coupled to the module bus bars 436, and the second impact absorbing space 216 may correspond to a space (or region) in which the terminal bus bars 176 and the module bus bars 436 are disposed.

In an exemplary embodiment of the present invention, the cell stack 100 further includes a pair of end supports 120 disposed at both end portions of the cell stack in the first direction X, where outer surfaces of the end supports may correspond to the end surfaces of the cell stack. The end walls 240 may be bent (or curved) outwardly along the first direction X, away from the respective end surfaces of the cell stack facing the end walls 240, and the end surfaces of the cell stack may be recessed inwardly along the first direction X, away from the respective end walls 240, thereby forming a swelling space 217.

As illustrated in FIGS. 2 and 9, in the battery module 1000 according to an exemplary embodiment of the present invention, the cell stack 100 may further include a pair of end supports 120 disposed at both end portions of the respective cell stack in the first direction X, and having the outer side surfaces corresponding to the end surfaces of the cell stack.

Figure 11:
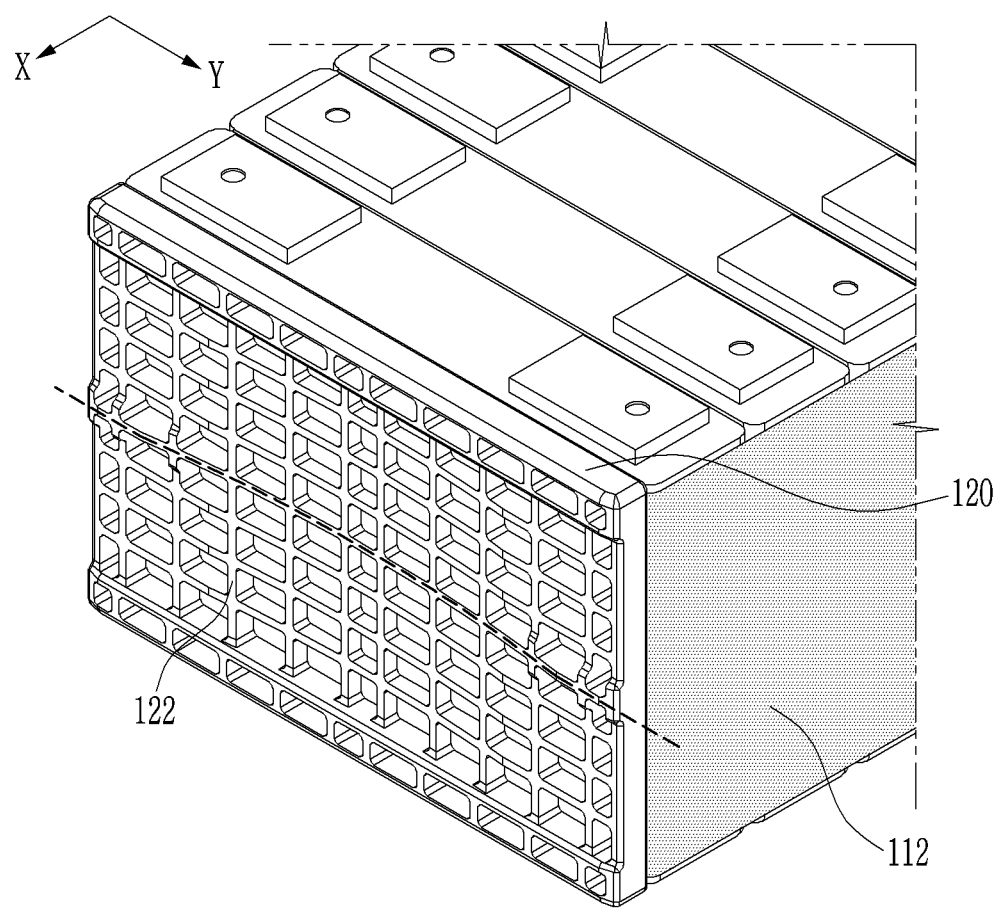
FIG. 11 is a view illustrating an end surface of the end support in the battery module according to an exemplary embodiment of the present invention.

In an exemplary embodiment of the present invention, the plurality of unit cells 110 are arranged such that at least a side surface thereof is surrounded by the insulating member 112, and the end supports 120 may be disposed such that the inner side surfaces of the end supports 120 are respectively in surface contact with the insulating member 112 at both ends of the cell stack 100 in the first direction X. However, an arrangement relationship between the insulating member 112 and the end supports 120 is not necessarily limited thereto. FIG. 11 illustrates an outer end surface of the end support 120.

The end supports 120 may be disposed at both ends of the cell stack 100 in the first direction X, such that outer side surfaces thereof may correspond to the end surfaces of the cell stack. The end supports 120 may serve to absorb the impact between the end walls 240 and the outermost unit cell, and may serve to uniformly deliver pressurization force of the end walls 240 to the outermost unit cell.

The outermost unit cell refers to the unit cell 110 positioned at the outermost portion of the cell stack 100 in the first direction X, from among the plurality of unit cells 110 constituting the cell stack 100, and in an exemplary embodiment of the present invention, the outermost cell is disposed at each of the two ends of the plurality of unit cells 110 arranged in the cell stack 100 in the first direction X.

Since the end walls 240 have a bent (or curved) shape, they do not engage the entire surface of the end supports 120, however, the end supports 120 may engage the insulating member 112 and the outer side surface of the outermost unit cell as the entire surface.

Figure 10:
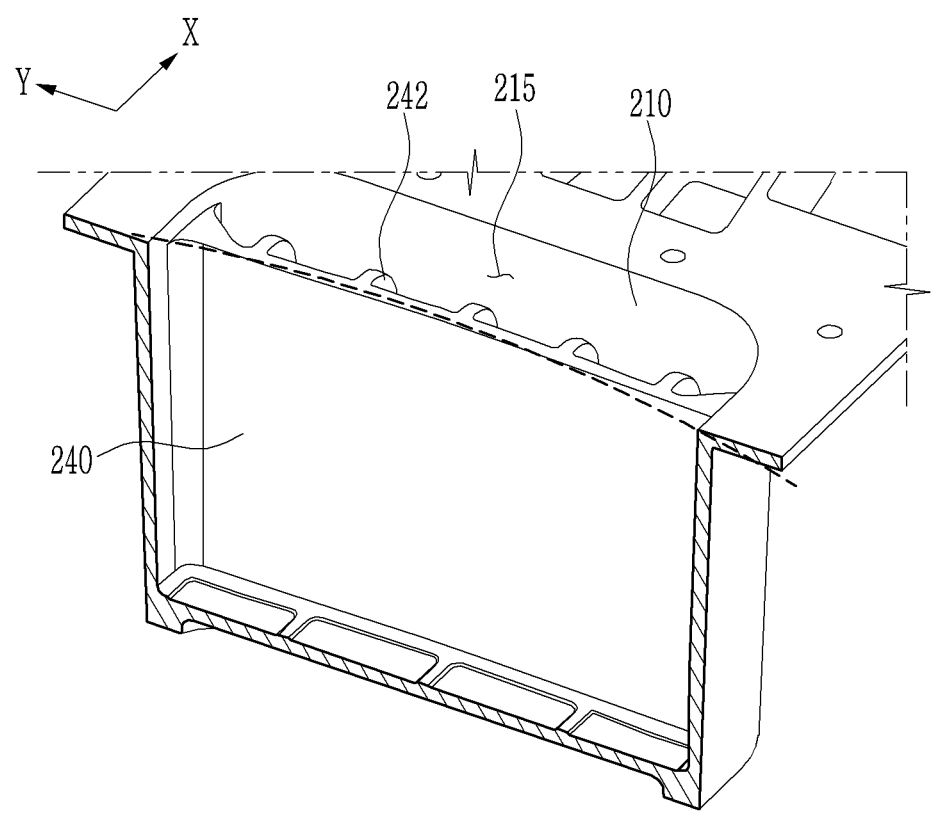
FIG. 10 is a perspective view of the end wall illustrating a shape of the end wall in the battery module according to an exemplary embodiment of the present invention.

In embodiments of the present disclosure, FIG. 9 illustrates a cross section of the end wall 240 in which the central portion thereof is bent (or curved) to be away from the end surface of the corresponding cell stack, and FIG. 10 illustrates an inner side surface of the bent (or curved) end wall 240 facing the end surface of the cell stack 100.

The end wall 240 is outwardly bent (or curved) so that the central portion thereof is away from the end surface of the cell stack facing the end wall 240, thereby making it possible to form the swelling space 217 between the end wall 240 and the end surface. The end wall 240 may be formed in a bent (or curved) shape such that the central portion thereof is away from the end surface (e.g., the end wall 240 may have a convex shape).

In another embodiment, the end wall 240 may be provided in a bent (or curved) shape as illustrated in FIGS. 9 and 10.

The end wall 240 has the bent (or curved) shape so that a space is formed in at least a central portion between the end wall 240 and the respective end surfaces of the cell stack 100, and the formed space corresponds to the swelling space 217 according to an exemplary embodiment of the present invention.

In the unit cells 110 constituting the cell stack 100, a swelling phenomenon may occur in which a gas is generated from an internal electrode assembly and the unit cell swells due to the endurance progress of the use (e.g., due to the continuing use of the battery) or a surrounding situation, and it is thus important that the plurality of unit cells 110 are aligned to implement a structure capable of appropriately coping with such swelling.

When the swelling phenomenon occurs, the unit cells 110 may have a large amount of expansion in the central portion of the side surface positioned along the first direction X due to structural characteristics thereof, and accordingly, in an exemplary embodiment of the present invention, the swelling space 217 may be formed between the end wall 240 and the end surface of the cell stack so as to accommodate a volume expansion of the cell stack 100 when the swelling phenomenon of the cell stack 100 occurs.

As described above, it is desirable that the cell stack 100 is engaged along the first direction X in terms of efficiency such as energy density and/or the like. In an exemplary embodiment of the present invention, even though the end wall 240 provided in a bent (or curved) shape, since at least both ends (edges) of the end wall 240 maintain an engaged state of the end surface of the cell stack, the cell stack 100 may be suitably operated.

As illustrated in FIG. 11, the outer surface of the end support 120 may be inwardly recessed so that a central portion thereof extends away from the end wall 240 facing the end support 120. That is, the end support 120 may have a shape in which the central portion of the outer surface is recessed.

The end surface of the cell stack corresponding to an outer side surface of the end support 120 may have a shape in which the central portion thereof is recessed inward so that a space is formed in at the least the region corresponding to the central portion between the end wall 240 and the end surface, similar to how a swelling space 217 may be formed in at least the central portion between the end support 120 and the end wall 240 when the end wall 240 has a bent (or curved) shape.

In an exemplary embodiment of the present invention, the outer side surface of the end wall 240 may include a plurality of first ribs 242 (see FIG. 9) protruding in the first direction X and extending along the height direction of the end wall 240. The plurality of first ribs 242 may be spaced apart from each other in the second direction Y. In some embodiments, the end support 120 may include a plurality of second ribs 122 disposed to be spaced apart from each other in the second direction Y and in a height direction of the end support 120 to form a lattice shape on the outer surface of the end support 120.

As illustrated in FIGS. 2 and 9, the plurality of first ribs 242 may be formed on the end wall 240 according to an exemplary embodiment of the present invention. For example, the end wall 240 may include the plurality of first ribs 242 on the outer side surface thereof with respect to the first direction X.

The end wall 240 needs to be robust against external impact while pressurizing the end surface of cell stack 100. Further, even though the swelling space 217 is formed, a change in length of the cell stack 100 may occur beyond an accommodating range of the swelling space 217, and thus, the end wall 240 is required (or desired) to have the mechanical strength to prevent or reduce the risk of breakage.

In an exemplary embodiment of the present invention, as illustrated in FIGS. 2 and 9, the plurality of first ribs 242 may be provided on the outer side surface of the end wall 240, that is, a surface facing the outer wall 210 or a surface opposite to the cell stack 100.

The first ribs 242 may be formed on the outer side surface of the end wall 240 to protect the cell stack 100. The outer side surface of the end wall 240 refers to a surface facing oppositely from the end support 120. The first ribs 242 may be separately manufactured and may be coupled to the end wall 240, and in some embodiments, may be formed integrally on the end wall 240 (e.g., through a casting process).

As illustrated in FIGS. 2 and 9, the plurality of first ribs 242 may extend in the height direction of the end wall 240 and may be disposed to be spaced apart from each other in the second direction Y.

The first ribs 242 may be provided in the form of a ridge extending in the height direction of the end wall 240. The first ribs 242 may effectively (or suitably) improve the strength of the end wall 240 and may be formed integrally with the end wall 240 in the casting process using an upper mold and a lower mold.

Further, the plurality of first ribs 242 are provided and are disposed to be spaced apart from each other along the second direction Y, thereby implementing a uniform and stable strength improvement over the entire end wall 240. FIG. 9 illustrates cross sections of the plurality of first ribs 242 disposed to be spaced apart from each other along the second direction Y.

FIG. 11 illustrates the end support 120 having the plurality of second ribs 122 formed on the outer end surface thereof. Since swelling force delivered from the plurality of unit cells 110 acts on the end support 120 when the swelling occurs, the end support 120 needs to be robust against deformation and breakage while coping with the expansion of the unit cells 110 due to the swelling phenomenon.

In some embodiments, the second ribs 122 are formed on the outer end surface of the end support 120 to improve robustness of the end support 120. An inner side surface of the end support 120, that is, a side opposite to the outer end surface, may be in surface contact with the outer side surface of the outermost cell of the cell stack 100 or the insulating member 112 to secure pressurization capability, and the second ribs 122 may be formed on the outer end surface of the end support 120.

As illustrated in FIG. 11, in an exemplary embodiment of the present invention, the second ribs 122 may be disposed to be spaced apart from each other in the second direction Y and the height direction of the end support 120 to form a lattice shape.

In an exemplary embodiment of the present invention, the second ribs 122 may be formed to cross substantially the entire outer end surface of the end support 120 along an extending direction, with some of the plurality of second ribs 122 extending in the second direction Y and the remainder thereof extending in the height direction of the end support 120, such that the plurality of second ribs 122 may be disposed to form a mutual lattice shape.

In some embodiments, substantially square-shaped grooves may be disposed (formed) in a lattice formation on the outer end surface of the end support 120. In some embodiments, the second ribs 122 may be separately manufactured and coupled to the end surface of the end support 120, or may be formed integrally when the end support 120 is manufactured.

In an exemplary embodiment of the present invention, the fixing wall 250 of any one of the receiving parts 220 may be defined as including the separation wall 230, the pair of end walls 240, and a portion of the outer wall 210, and the separation wall 230 and the end walls 240 may be formed integrally (e.g., through a casting process and/or the like).

As illustrated in FIG. 2, in an exemplary embodiment of the present invention, one surface of the four surfaces of the fixing wall 250 may correspond to the separation wall 230, other two surfaces may correspond to the end walls 240, respectively, and the remaining surface may constitute the outer wall 210 of the module housing 200.

In the battery module 1000 according to an exemplary embodiment of the present invention, the module housing 200 may have the bottom surface 260 formed integrally with the end walls 240, the separation wall 230, and the outer wall 210 (e.g., through the casting process).

That is, in an exemplary embodiment of the present invention, the end walls 240 and the separation wall 230 may be formed integrally with the module housing, and intaglios of the end wall 240 and the separation wall 230 may be integrally formed in the mold when the mold is manufactured, for example, for the casting process.

In an exemplary embodiment of the present invention, the end walls 240 and the separation wall 230 may be formed integrally with the outer wall 210 of the module housing 200. In this case, the outer wall 210, the separation wall 230, the end walls 240, and the bottom surface 260 of the module housing 200 may be all manufactured integrally.

Figure 12:
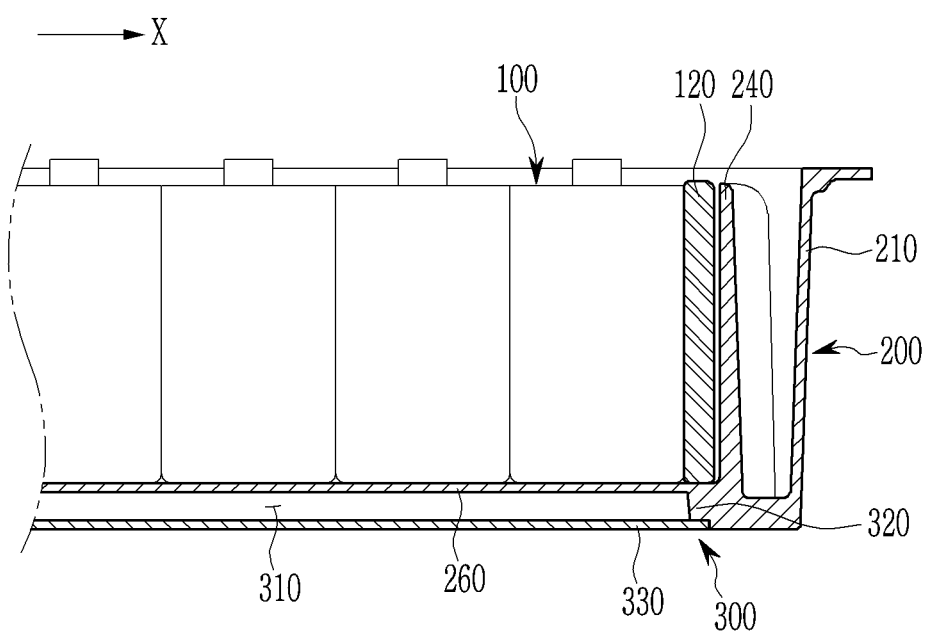
FIG. 12 is a view schematically illustrating a cooling channel in the battery module according to an exemplary embodiment of the present invention.
Figure 13:
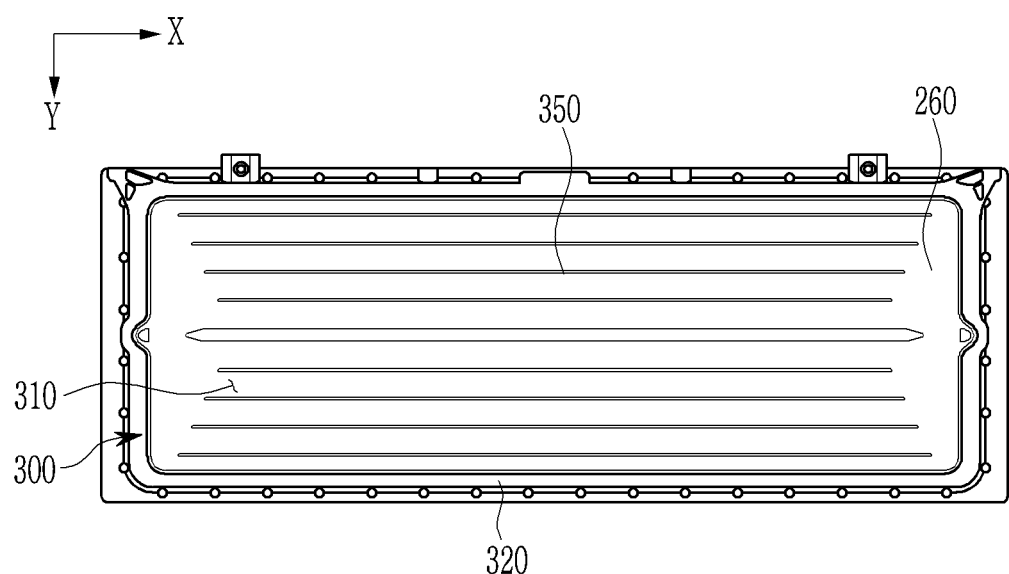
FIG. 13 is a bottom view of the cooling channel in the battery module according to an exemplary embodiment of the present invention.

FIG. 12 illustrates a cross section of the module housing 200 according to an exemplary embodiment of the present invention, and illustrates a structure in which a cooling channel 300 having a flowing space in which a coolant (e.g., cooling water) flows is formed below the bottom surface 260. FIG. 13 illustrates a bottom view of the cooling channel 300.

As illustrated in FIG. 12, in the battery module 1000 according to an exemplary embodiment of the present invention, the cooling channel 300 through which the cooling water flows may be formed below the bottom surface 260 of the module housing 200. In addition, a plurality of guide protrusions 350 extending in a flow direction of the cooling water and guiding the flow of the cooling water may be provided on a lower surface of the bottom surface 260 (facing the cooling channel 300), as illustrated in FIG. 13.

The flowing space 310 of the cooling channel 300 may be formed across the entirety of the bottom surface 260, or may be formed to correspond to a cross sectional area of the inner space of the module housing 200 in which the receiving parts 220 are formed. For example, a design may be performed so that the flowing space 310 of the cooling channel 300 does not overlap with the first impact absorbing space 215. The cooling water flows through the cooling channel 300, and various suitable refrigerants, such as air, for example, may also be used instead of the cooling water.

The unit cells 110 constituting the cell stack 100 may correspond to (may constitute) heating elements that dissipate heat during discharge, and in a case in which the temperature of the unit cells rises excessively (for example, beyond a set temperature), the swelling phenomenon may be induced or a thermal runaway phenomenon may occur where heat is rapidly increased due to an abrupt chemical reaction, and fire and/or the like may occur.

In embodiments in which the cell stack 100 includes the plurality of aligned unit cells 110, when the thermal runaway phenomenon occurs in any one of the unit cells 110, a thermal runaway diffusion phenomenon, which affects other peripheral unit cells 110, may also occur.

Accordingly, when the plurality of unit cells 110 are disposed, it is important to adequately cool the heat generated in the cell stack 100. The battery module 1000 according to an exemplary embodiment of the present invention may efficiently (or suitably) implement the cooling of the entirety of the plurality of cell stacks 100 by forming the cooling channel 300 below the bottom surface 260 of the module housing 200.

In addition, in an exemplary embodiment of the present invention, the maintenance and management of the cooling channel 300 may be more easily performed by forming the cooling channel 300 below the bottom surface 260 of the module housing 200 rather than the inside of the module housing 200, for example, in the inner space and the partitioned space of the module housing 200.

In the battery module 1000 according to an exemplary embodiment of the present invention, a side wall 320 of the cooling channel 300 protrudes downwardly from the bottom surface 260 and extends along an edge of the bottom surface 260 to surround the bottom surface 260, and a channel cover 330 may be coupled to a lower end of the side wall 320 to seal the cooling channel 300.

In some embodiments, the side wall 320 of the cooling channel 300 may be formed integrally with the bottom surface 260 of the module housing 200 (e.g., through the casting process), and the channel cover 330 may be coupled to the side wall 320 of the cooling channel 300 by welding.

FIG. 12 illustrates a structure in which the side wall 320 of the cooling channel 300 extends along the edge of the bottom surface 260 of the module housing 200, is provided to surround the bottom surface 260, and protrudes downwardly from the bottom surface 260.

In an exemplary embodiment of the present invention, since the side wall 320 of the cooling channel 300 is formed integrally with the bottom surface 260 of the module housing 200 (e.g., through the casting process), a coupled portion between the side wall 320 and the bottom surface 260 does not exist (e.g., an element coupling the side wall 320 to the bottom surface 260 is not present), and accordingly, a situation in which the coolant (e.g., cooling water) leaks unintentionally into the module housing 200 may be prevented in advance or the risk of such situation occurring may be reduced.

The channel cover 330 sealing the cooling channel 300 may be coupled to the side wall 320 of the cooling channel 300 by a method such as welding, and an edge of the channel cover 330 may be coupled to a lower end of the side wall 320.

Various suitable methods of coupling the channel cover 330 to the side wall 320 of the cooling channel 300 may be used, for example, a gasket may be provided or a welding coupling may be used to prevent or reduce leakage of the cooling water. FIG. 13 illustrates a bottom view of the cooling channel 300 in a state in which the channel cover 330 is removed.

The outer wall 210 and the bottom surface 260 of the module housing 200 and the side wall 320 of the cooling channel 300 may all be formed integrally (e.g., through the casting process), in order to prevent or reduce the leakage of the coolant (e.g., cooling water). Further, since the cooling channel 300 is provided below the bottom surface 260 of the module housing 200, that is, to the outside of the inner space of the module housing 200, it may be possible to prevent or reduce the risk of a situation in which the cooling water leaks into the inner space of the module housing 200 in which the cell stacks 100 exists, even when there is leakage of the cooling water unintentionally generated in the cooling channel 300.

According to embodiments of the present invention, since the plurality of cell stacks 100 are inserted in the battery module, the assembly process and constituent components may be simplified, the high power demand may be effectively (or suitably) satisfied, the plurality of cell stacks 100 may be effectively (or suitably) cooled through the cooling channel 300, and the plurality of cells stacks 100 may be effectively (or suitably) protected from a leakage phenomenon of the cooling water which may be occur in the cooling channel 300.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to"

another element, there are no intervening elements present. For example, when a first element is described as being "coupled" or "connected" to a second element, the first element may be directly coupled or connected to the second element or the first element may be indirectly coupled or connected to the second element via one or more intervening elements.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

| Description of symbols | |
|---|---|
| 100: cellstack | 110: unit cell |
| 112: insulating member | 120: end support |
| 122: second rib | 150: terminal part |
| 151: first terminal | 152: second terminal |
| 172: stack bus bar | 174: connection bus bar |
| 176: terminal bus bar | 178: cross bus bar |
| 180: connecting member | |
| 200: module housing | 210: outer wall |
| 211: first wall | 212: second wall |
| 215: first impact absorbing space | |
| 216: second impact absorbing space | |
| 220: receiving part | 230: separation wall |
| 240: end wall | 242: first rib |
| 250: fixing wall | 260: bottom surface of module housing |
| 300: cooling channel | 310: flowing space |
| 320: side wall of cooling channel | 330: channel cover |
| 350: guide protrusion | 400: coupling part |
| 410: fastening part | 415: fastening member |
| 420: guide part | 422: guide pin |
| 424: guide groove | 430: connection part |
| 432: connection tunnel | 434: tunnel insertion hole |
| 436: module bus bar | 438: connection line |
| 1000: battery module | |

What is claimed is:

1. A battery module comprising:
a plurality of cell stacks, each of the plurality of cell stacks comprising a plurality of unit cells aligned with each other in a first direction, each of the plurality of unit cells comprising terminal parts;
the plurality of cell stacks being arranged in a first column and a second column in the first direction, each of the first column and the second column extending in a second direction crossing the first direction, and wherein cell stacks that are adjacent to each other in the second direction from among the plurality of cell stacks are electrically connected to each other;
a stack bus bar electrically connecting at least some of the plurality of unit cells to each other;
a connection bus bar electrically connecting two cell stacks that are adjacent to each other in the second direction from among the plurality of cell stacks; and
a terminal bus bar extending from a corresponding one of the plurality of cell stacks,
wherein the terminal bus bar is connected to a unit cell of the plurality of unit cells at one end of the corresponding one of the plurality of cell stacks, and the connection bus bar is connected to a unit cell of the plurality of unit cells at an other end of the corresponding one of the plurality of cell stacks,
wherein the terminal bus bars in the first column and the terminal bus bars in the second column are alternatively arranged along the second direction.

2. The battery module of claim 1, further comprising:
a module housing comprising a plurality of receiving parts aligned in the first direction and the second direction, wherein each of the plurality of cell stacks is configured to be inserted into a corresponding one of the plurality of receiving parts; and
a module bus bar connected to the terminal bus bar and configured to be extended outside of the module housing and inserted into an adjacent module housing.

3. The battery module of claim 2, wherein:
the terminal bus bar extends to overlap a region between the first column and the second column.

4. The battery module of claim 3, wherein:
each of the plurality of cell stacks comprises a plurality of cell groups, each of the plurality of cell groups comprising one or more unit cells in which the terminal parts having the same polarity face each other in the first direction, and
the stack bus bar extends in the first direction and connects two cell groups of the plurality of cell groups in series, wherein the two cell groups of the plurality of cell groups are adjacent to each other and have the terminal parts of different polarities face each other in the first direction.

5. The battery module of claim 4, wherein:
any one of the two cell stacks of the plurality of cell stacks electrically connected to each other through the connection bus bar comprises two cell groups of the plurality of cell groups adjacent to each other in the first direction and having the terminal parts of the same polarity face each other in the first direction, and
the battery module further comprises a cross bus bar crossing the first direction and diagonally connecting one or more unit cells in one of the two cell groups with one or more unit cells in adjacent one of the two cell groups.

6. The battery module of claim 5, wherein:
the connection bus bar and the cross bus bar are connected to the unit cell of the other end of the corresponding one of the cell stacks opposite from the one end of the corresponding one of the cell stacks facing a region between the first column and the second column.

7. The battery module of claim 3, further comprising:
a coupler in the module housing and coupled to an adjacent module housing; and
an outer wall around an inner space of the module housing, the outer wall comprising a first wall facing the second direction and a second wall opposite the first wall,
wherein the coupler comprises:
a connection tunnel at a central portion of the first wall, the connection tunnel protruding in the second direction and comprising a hollow region into which the module bus bar is configured to extend from inside the module housing; and
a tunnel insertion hole on the second wall configured to receive the connection tunnel of the adjacent module housing and the module bus bar.

8. The battery module of claim 7, wherein:
the module bus bar connected to the cell stack in the first column and the module bus bar connected to the cell stack in the second column extend outside of the module housing through the connection tunnel.

9. The battery module of claim 7, wherein
the coupler further comprises:
guide pins at both sides of the connection tunnel on the first wall and protruding in the second direction;
guide grooves on the second wall configured to receive the guide pins of the adjacent module housing; and
fasteners on the first wall and the second wall, respectively, configured to fasten the first wall of the module housing and the second wall of the adjacent module housing.

10. The battery module of claim 7, wherein
a fixing wall of one of the plurality of receiving parts comprises:
a separation wall extending in the first direction and being in contact with a side surface of the cell stack; and
a pair of end walls respectively extending from both ends of the separation wall in the second direction and configured to engage a corresponding one of the plurality of cell stacks in directions parallel to the first direction, respectively.

11. The battery module of claim 10, wherein:
a first end wall of the pair of end walls faces the outer wall of the module housing and is spaced from the outer wall along the first direction; and
a first impact absorbing space exists between the first end wall and the outer wall.

12. The battery module of claim 11, wherein:
a second end wall of the pair of end walls faces an adjacent one of the plurality of receiving parts in the first direction;
a second impact absorbing space exists between the respective second end walls of two receiving parts adjacent to each other in the first direction from among the plurality of receiving parts; and
the terminal bus bar extends to overlap the second impact absorbing space.

13. The battery module of claim 12, wherein:
each of the plurality of cell stacks further comprises a pair of end supports arranged in the first direction at the one end and the other end of the corresponding one of the plurality of cell stacks, a first end support of the pair of end supports facing the first end wall and a second end support of the pair of end supports facing the second end wall;
the first and second end walls are curved outwardly in directions parallel to the first direction so that central portions thereof extend away from the first and second end supports, respectively, and the first and second end supports are recessed inwardly in directions parallel to the first direction so that central portions thereof extend away from the first and second end walls, respectively; and
a swelling space exists between the pair of end walls and the corresponding one of the pair of end supports.

14. The battery module of claim 13, wherein:
each of the first and second end walls comprises a plurality of first ribs extending in a height direction of the corresponding one of the first and second end walls, the plurality of first ribs being spaced from each other in the second direction; and
each of the first and second end supports comprises a plurality of second ribs on a surface of the corresponding one of the first and second end supports, the plurality of second ribs being spaced from each other in the second direction and in a height direction of the corresponding one of the first and second end supports.

15. The battery module of claim 2, wherein:
an end module is located at an opposite end of an electricity-consuming device in a battery pack to which a plurality of battery modules are coupled,
the module housing corresponds to a module housing of the end module, and
a connecting member connects terminal bus bars of a pair of the plurality of cell stacks adjacent to each other in the first direction in the module housing of the end module.

16. The battery module of claim 2,
wherein the module housing comprises a cooling channel coupled to a bottom surface of the module housing, and
wherein the cooling channel is configured to receive a coolant to flow therethrough.

* * * * *